United States Patent
Wang et al.

(10) Patent No.: US 8,894,094 B2
(45) Date of Patent: Nov. 25, 2014

(54) CURTAIN AIRBAG FOR SMALL OVERLAP

(71) Applicant: Autoliv ASP, Inc., Ogden, UT (US)

(72) Inventors: Xiaohong Wang, Roy, UT (US);
Takayuki Makioka, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/837,701

(22) Filed: Mar. 15, 2013

(65) Prior Publication Data

US 2014/0265268 A1    Sep. 18, 2014

(51) Int. Cl.
B60R 21/16    (2006.01)

(52) U.S. Cl.
USPC ........................................... 280/730.2

(58) Field of Classification Search
CPC .. B60R 21/232; B60R 21/213; B60R 21/214; B60R 21/23138; B60R 21/2334; B60R 21/2338
USPC ............................ 280/730.2, 743.2
See application file for complete search history.

(56) References Cited

U.S. PATENT DOCUMENTS

| | | | |
|---|---|---|---|
| 5,636,862 A | 6/1997 | Cheung et al. | |
| 5,791,685 A | 8/1998 | Lachat et al. | |
| 6,234,516 B1 | 5/2001 | Boxey | |
| 6,237,943 B1 | 5/2001 | Brown et al. | |
| 6,361,068 B1 | 3/2002 | Stein et al. | |
| 6,565,118 B2 | 5/2003 | Bakhsh et al. | |
| 6,695,347 B2 * | 2/2004 | Sonnenberg et al. | 280/743.2 |
| 6,709,008 B2 | 3/2004 | McGee et al. | |
| 6,877,769 B2 * | 4/2005 | Kim et al. | 280/730.2 |
| 7,093,854 B2 | 8/2006 | Fischer et al. | |
| 7,325,826 B2 | 2/2008 | Noguchi et al. | |
| 7,549,672 B2 | 6/2009 | Sato et al. | |
| 7,556,290 B2 | 7/2009 | Williams et al. | |
| 7,621,561 B2 | 11/2009 | Thomas et al. | |
| 7,712,773 B2 | 5/2010 | Walston | |
| 7,712,774 B2 | 5/2010 | Garner et al. | |
| 7,762,578 B2 * | 7/2010 | Dix | 280/730.2 |
| 7,823,922 B2 | 11/2010 | Mitchell et al. | |
| 7,841,621 B2 | 11/2010 | Dix | |
| 8,025,309 B2 * | 9/2011 | Steinbach et al. | 280/730.2 |
| 8,186,710 B2 * | 5/2012 | Cheal et al. | 280/730.2 |
| 8,262,130 B2 | 9/2012 | Fischer et al. | |

(Continued)

FOREIGN PATENT DOCUMENTS

| | | |
|---|---|---|
| EP | 1824710 | 8/2007 |
| EP | 1781508 B1 | 9/2009 |

*Primary Examiner* — Faye M. Fleming
(74) *Attorney, Agent, or Firm* — Madson IP, P.C.

(57) ABSTRACT

An airbag assembly may include an inflatable curtain airbag with a stowed configuration and a deployed configuration. The inflatable curtain may have a first protection zone and a second protection zone that inflates forward of the first protection zone to provide enhanced protection. The second protection zone may be double-folded against the first protection zone so that, during deployment, the second protection zone pivots to unfold relative to the first protection zone. The airbag assembly may have a restraint member in the form of a forward tether or a first tether secured to the forward tether such that the restraint member exerts outboard force on the second protection zone during deployment to help control deployment of the second protection zone. Portions of the first and second protection zones may be fold-over sewn together to control the angle at which the second protection zone unfolds relative to the first protection zone.

18 Claims, 15 Drawing Sheets

(56) References Cited

U.S. PATENT DOCUMENTS

| | | |
|---|---|---|
| 8,272,664 B2 | 9/2012 | Benny et al. |
| 8,282,124 B2 | 10/2012 | Trovato et al. |
| 2009/0033081 A1 | 2/2009 | Flischer et al. |
| 2010/0013203 A1* | 1/2010 | Mitchell et al. ............ 280/743.2 |
| 2012/0267883 A1 | 10/2012 | Fischer et al. |
| 2012/0286499 A1 | 11/2012 | Wiik et al. |
| 2013/0134694 A1* | 5/2013 | Matsushita et al. ........... 280/729 |
| 2013/0270805 A1* | 10/2013 | Kruse et al. ................ 280/730.2 |

\* cited by examiner

CURTAIN AIRBAG FOR SMALL OVERLAP

TECHNICAL FIELD

The present invention relates to automotive safety. More specifically, the present invention relates to inflatable airbag curtains and methods that provide enhanced protection for collisions such as small overlap and oblique frontal collisions, rollovers, and side impact collisions.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between an occupant and the side of a vehicle's interior. This might occur when another vehicle collides with the side of the car, or in a rollover situation where the side of car is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Recent safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The occupants of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide the protection that is most needed. The result may be injuries from impact with interior vehicle surfaces and/or ejection from the vehicle, despite deployment of the airbag systems.

Additionally, one safety need that has recently become apparent is the need for enhanced protection in the event of "small overlap" and "oblique" collisions. A small overlap collision is a frontal collision in which the impact occurs on a relatively narrow portion on the left or right side of the front of the vehicle. An oblique collision is a frontal collision in which the impact occurs at an angle from head-on and on a relatively narrow portion on the left or right side of the front of the vehicle. Such collisions may lead to greater deformation of the vehicle structure on the side on which the impact occurs. Also, such collisions tend to cause the center of the vehicle to rotate away from the line of travel which can cause the vehicle occupant to move in a forward outboard trajectory. Additionally, existing airbag systems may not sufficiently protect against small overlap and oblique collisions because the trajectory of the occupants within the vehicle may be different from those for which the airbag systems are designed to provide protection. For example, in a vehicle with a driver's side airbag and an inflatable curtain airbag, the driver's head may move forward with a vector that has forward and lateral components so that the head tends to move between the deployed driver's side airbag and the deployed inflatable curtain airbag. This may cause the driver's head to strike the A-pillar or the instrument panel of the vehicle in spite of the deployment of the airbag systems.

SUMMARY OF THE INVENTION

The various systems and methods of the present invention have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present invention may have other benefits that are not specifically set forth herein.

To achieve the foregoing, and in accordance with the invention as embodied and broadly described herein, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have a first protection zone comprising a first interior chamber, and a second protection zone comprising a second interior chamber in fluid communication with the first interior chamber. The airbag assembly may further have a restraint member coupled to the second protection zone. In the stowed configuration, the inflatable curtain airbag may be folded at a first stowed fold line such that the second protection zone lies alongside a portion of the first protection zone. During deployment, the restraint member may exert outboard force on the second protection zone to move the second protection zone forward to be positioned forward of the first protection zone in the deployed configuration. In the deployed configuration, the second protection zone may be positioned between an occupant zone that would ordinarily be occupied by the vehicle occupant's head and at least one of an A-pillar of the vehicle and a portion of an instrument panel of the vehicle.

In the deployed configuration, the second protection zone may extend to a height proximate the roof of the vehicle. The inflatable curtain airbag may further have a deployed fold line that is a divider that defines the first interior chamber as distinct from the second interior chamber. In the deployed configuration, the second protection zone may be unfolded at the deployed fold line to define an angle less than 180° relative to the first protection zone. The inflatable curtain airbag may further have an inboard section that faces inboard in the deployed configuration. The inflatable curtain airbag may have fold-over stitching by which the inboard section of the first protection zone is secured to the inboard section of the second protection zone. The fold-over stitching may be displaced from the deployed fold line by a displacement selected to keep the second protection zone from unfolding beyond the angle.

In the stowed configuration, the inflatable curtain airbag may be further folded at a second stowed fold line generally parallel to the first stowed fold line such that the inflatable curtain airbag defines a Z-shape when viewed from along the first and second stowed fold lines. The restraint member may be a forward tether with a first end secured to the inflatable curtain airbag and a second end securable to the A-pillar. The second protection zone may have an opening proximate a forward edge of the second protection zone. The forward tether may extend through the opening such that, during deployment, the opening slides along the tether toward the second end of the forward tether to urge the forward edge to move generally along the forward tether.

The inflatable curtain airbag may have an outboard section that faces outboard in the deployed configuration. The first end of the forward tether may be secured to an outboard section of the first protection zone such that, between the first end and the opening, the tether is positioned outboard of the inflatable curtain airbag. The airbag assembly may further have a forward tether with a first end secured to the inflatable curtain airbag and a second end securable to the A-pillar. The second protection zone may have an opening proximate a forward edge of the second protection zone.

The restraint member may have a first tether with an intermediate portion that extends through the opening such that, during deployment, the opening slides along the intermediate portion to urge the forward edge to move generally along the first tether. The first tether may further have a first end secured to the forward tether, and a second end secured to the forward tether at a location selected such that, in the deployed configuration, the second end of the forward tether is forward of the first end of the forward tether.

The airbag assembly may further include a plurality of mounting assemblies distributed along a length of the inflatable curtain airbag to facilitate attachment of the inflatable curtain airbag to the vehicle. In the stowed configuration, all of the plurality of mounting assemblies may be positioned rearward of the A-pillar so that the second end of the forward tether is the only feature of the airbag assembly that is secured to the A-pillar. The airbag assembly may further include an inflator that produces gas in response to detection of impact to trigger deployment of the inflatable curtain airbag, and a rearward tether with a first end secured to the inflatable curtain airbag and a second end securable to the vehicle rearward of the inflatable curtain airbag. In the deployed configuration, the rearward tether and the forward tether may cooperate to keep the first protection zone under tension in a longitudinal direction.

According to one method, an airbag assembly may be stowed proximate a roof of a vehicle having a lateral surface to protect a vehicle occupant. The method may include providing an inflatable curtain airbag with a first protection zone having a first interior chamber and a second protection zone having a second interior chamber in fluid communication with the first interior chamber, providing a restraint member, folding the inflatable curtain airbag at a first stowed fold line such that the second protection zone overlies at least a portion of the first protection zone, compacting the inflatable curtain airbag into a generally elongated shape, and securing the inflatable curtain airbag proximate the roof of the vehicle. In response to introduction of inflation gas into the inflatable curtain airbag, the first protection zone may expand downward to be positioned between the vehicle occupant and the lateral surface of the vehicle. The method may further include coupling the restraint member to the second protection zone such that, during deployment, the restraint member exerts outboard force on the second protection zone to move the second protection zone forward to be positioned forward of the first protection zone. The inflatable curtain airbag may have a deployed fold line that is a divider that defines the first interior chamber as distinct from the second interior chamber. Unfolding the second protection zone may include positioning the second protection zone between an occupant zone that would ordinarily be occupied by the vehicle occupant's head and at least one of an A-pillar of the vehicle and a portion of an instrument panel of the vehicle.

The inflatable curtain airbag may have a deployed fold line that is a divider that defines the first interior chamber as distinct from the second interior chamber. Unfolding the second protection zone may include unfolding the second protection zone at the deployed fold line to define an angle less than 180° relative to the first protection zone after deployment. The inflatable curtain airbag may include an inboard section that faces inboard after deployment. The method may further include securing the inboard section of the first protection zone the inboard section of the second protection zone with fold-over stitching displaced from the deployed fold line by a displacement selected to keep the second protection zone from unfolding beyond the angle during deployment.

The method may further include folding the inflatable curtain airbag at a second stowed fold line generally parallel to the first stowed fold line such that the inflatable curtain airbag defines a Z-shape when viewed from along the first and second stowed fold lines. The restraint member may be a forward tether with a first end and a second end, and the second protection zone may have an opening proximate a forward edge of the second protection zone. The method may further include securing the first end of the forward tether to the inflatable curtain airbag, securing the second end of the forward tether to the A-pillar, and inserting the forward tether through the opening such that, during deployment, the opening slides along the tether toward the second end of the forward tether to urge the forward edge to move generally along the forward tether.

The second protection zone may have an opening proximate a forward edge of the second protection zone. The method may further include providing a forward tether having a first end secured to the inflatable curtain airbag and a second end securable to the A-pillar. The restraint member may be a first tether with an intermediate portion that extends through the opening such that, during deployment, the opening slides along the intermediate portion to urge the forward edge to move generally along the first tether.

An airbag assembly may include an airbag within a vehicle. The airbag may have a first protection zone and a second protection zone folded against the first protection zone such that the second protection zone overlies at least a portion of the first protection zone. The airbag may have a deployed fold line that is a divider that defines a first interior chamber of the first protection zone as distinct from a second interior chamber of the second protection zone. The first protection zone may be secured to the second protection zone via fold-over stitching displaced from the deployed fold line by displacement. The airbag assembly may further include an inflator in fluid communication with a first chamber within the first protection zone and a second chamber within the second protection zone. In response to production of gas by the inflator, the airbag may deploy such that the first protection zone is positioned between an occupant of the vehicle and an interior surface of the vehicle. In response to production of the gas, the second protection zone may pivot away from first protection zone. During deployment, the second protection zone may unfold at the deployed fold line. The displacement may be selected such that the fold-over stitching limits unfolding of the second protection zone to an angle less than 180° relative to the first protection zone.

the airbag may be an inflatable curtain airbag having a stowed configuration proximate a roof of the vehicle and a deployed configuration into which the inflatable curtain airbag deploys downward between the occupant and the at least one lateral surface of the vehicle. The airbag assembly may further have a restraint member coupled to the second protection zone such that, during deployment, the restraint member urges the second protection zone to unfold forward of the first protection zone.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 15, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
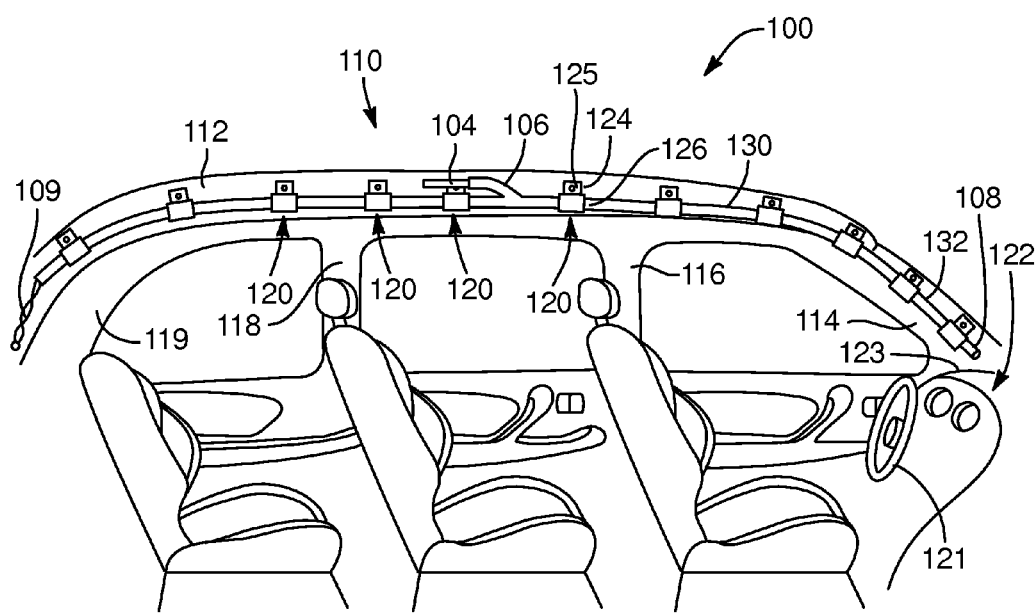
FIG. 1 is a side elevation view of an airbag assembly in a stowed configuration within a vehicle according to one embodiment of the invention.
Figure 1:
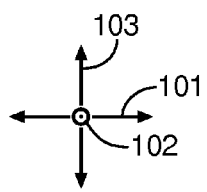

Referring to FIG. 1, an airbag assembly 100 may be used to protect the occupants of a vehicle during a side collision or roll-over collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward. The terms "inboard" and "outboard" may be used to refer to the position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two equal halves. "Inboard" and "outboard" do not require alignment of the two objects in the lateral direction 102; rather, these terms simply relate to proximity to the lateral or medial planes as set forth above.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

The airbag assembly 100 may include an inflator 104, a tube 106, and an inflatable curtain airbag 110 that receives gas from the inflator 104 via the tube 106. The airbag assembly 100 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. The inflator 104 may be stored at any suitable location relative to the inflatable curtain airbag 110. If the inflator 104 is a pyrotechnic inflator, the inflator 104 may contain a propellant that ignites to rapidly produce inflation gas in response to receipt of the activation signal.

The inflatable curtain airbag 110 may extend along the longitudinal direction 101 within the vehicle. The inflatable curtain airbag 110 may be coupled to or next to a roof rail 112 of the vehicle. The airbag assembly 100 may also include a forward tether 108 and a rearward tether 109 that are coupled proximate the front and rear ends, respectively, of the inflatable curtain airbag 110. Upon inflation of the inflatable curtain airbag 110, the forward tether 108 and the rearward tether 109 may provide tension that helps keep the inflatable curtain airbag 110 in place.

In the event of a collision, the inflatable curtain airbag 110 may expand downward along the side of the vehicle between the vehicle occupants and one or more lateral surfaces of the vehicle such as the side windows and pillars (the structures between the lateral windows and/or the windshield and rear window) of the vehicle. The pillars may include an A-pillar 114, a B-pillar 116, a C-pillar 118, and, if present, a D-pillar 119, all of which may join the roof rail at their upper ends. In some embodiments, an inflatable curtain airbag may extend from an A-pillar to a C-pillar of the vehicle. In other embodiments such as that illustrated in FIG. 1, the inflatable curtain airbag 110 may extend from the A-pillar 114 to a D-pillar 119 of the vehicle.

In addition to the airbag assembly 100, other airbags may be installed in the vehicle. For example, a separate driver's side airbag (not shown in FIG. 1) may be used to protect an occupant (i.e., the driver) from impact with various forward surfaces of the vehicle, including the steering wheel 121 and instrument panel 122. The airbag assembly 100 may provide supplemental protection by cushioning impact not only against the lateral surfaces mentioned previously, but also cushioning impact against the A-pillar 114 and/or an outboard portion 123 of the instrument panel 122. The outboard portion 123 is the portion of the instrument panel 122 that lies generally outboard of the steering wheel 121.

The inflatable curtain airbag 110 may normally reside in a stowed configuration, in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes a generally elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting assemblies 120 distributed along the length of the inflatable curtain airbag 110. Each of the mounting assemblies 120 may include a tab 124 secured to the inflatable curtain airbag 110, a fastener 125 that secures the tab 124 to the roof rail 112, and a wrapper 126 that encircles the inflatable curtain airbag 110 to keep the inflatable curtain airbag 110 in the stowed configuration until deployment.

In alternative embodiments, different mounting assemblies may be used. Such mounting assemblies may include tabs that are integrally formed with the inflatable curtain airbag, alternative fasteners, or the like. The wrappers 126 may not be present in all embodiments; other embodiments may utilize different features or attachment methods to keep the inflatable curtain airbag compacted. Such wrappers or other features may be independent of the mounting assemblies used to secure the inflatable curtain airbag to the vehicle.

As shown, the inflatable curtain airbag 110 may have a first protection zone 130 secured to the roof rail 112 and a second protection zone 132 secured to the pillar 114. Thus, the mounting assemblies 120 may be arranged along the length of the inflatable curtain airbag 110 from a rear location on or near the D-pillar 119 to a forward location proximate a forward end of the A-pillar 114.

Upon activation, the inflator 104 may generate and/or release inflation gas into the tube 106. From the tube 106, the inflation gas may rapidly enter the inflatable curtain airbag 110, thereby causing the inflatable curtain airbag 110 to begin expanding. In response to the expansion, the wrappers 126 may break to release the inflatable curtain airbag 110. Thus, the inflatable curtain airbag 110 may exit the stowed configuration and assume an extended shape. This process is called "deployment." When deployment is complete, the inflatable curtain airbag 110 may be said to be in a deployed configuration, as will be shown and described in FIG. 2.

Figure 2:
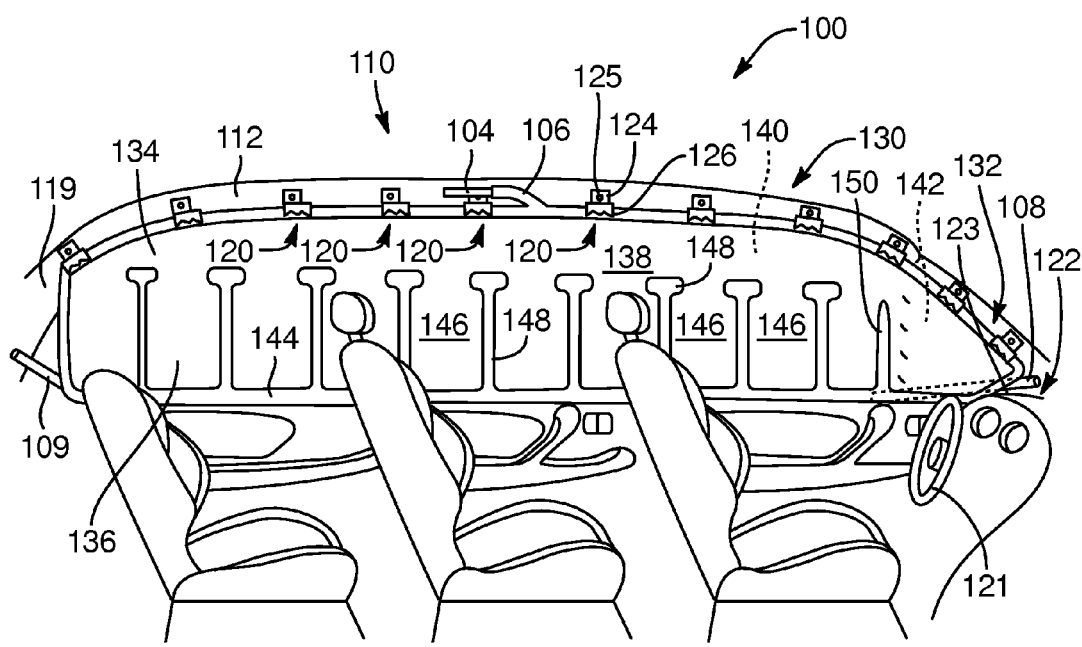
FIG. 2 is a side elevation view of the airbag assembly of FIG. 1, wherein the inflatable curtain airbag is in a deployed configuration.
Figure 2:
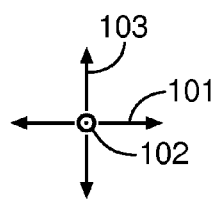

Referring to FIG. 2, a perspective view illustrates the airbag assembly 100, wherein the inflatable curtain airbag 110 is in the deployed configuration. The inflatable curtain airbag 110 may inflate upon activation of the inflator 104 and/or other optional inflators such that the inflatable curtain airbag 110 transitions from the stowed configuration to the deployed configuration. During deployment, the wrapper 126 may tear such that inflatable curtain airbag 110 can exit the stowed configuration. The inflatable curtain airbag 110 may also extend past a B-pillar 116 and a C-pillar 118 (shown in FIG. 1, but obscured in FIG. 2) such that in a deployed configuration, the inflatable curtain airbag at least partially covers the B-pillar 116 and the C-pillar 118, as depicted in FIG. 2. The inflatable curtain airbag 110 may also cover a portion of the D-pillar 119.

FIG. 2 illustrates the positioning of the first protection zone 130 and the second protection zone 132. The first protection zone 130 may generally cover the lateral surfaces of the vehicle from the steering wheel 121 rearward, while the second protection zone 132 covers the lateral surfaces forward of the steering wheel 121. The inflatable curtain airbag 110 may have an upper portion 134 and a lower portion 136.

Figure 3:
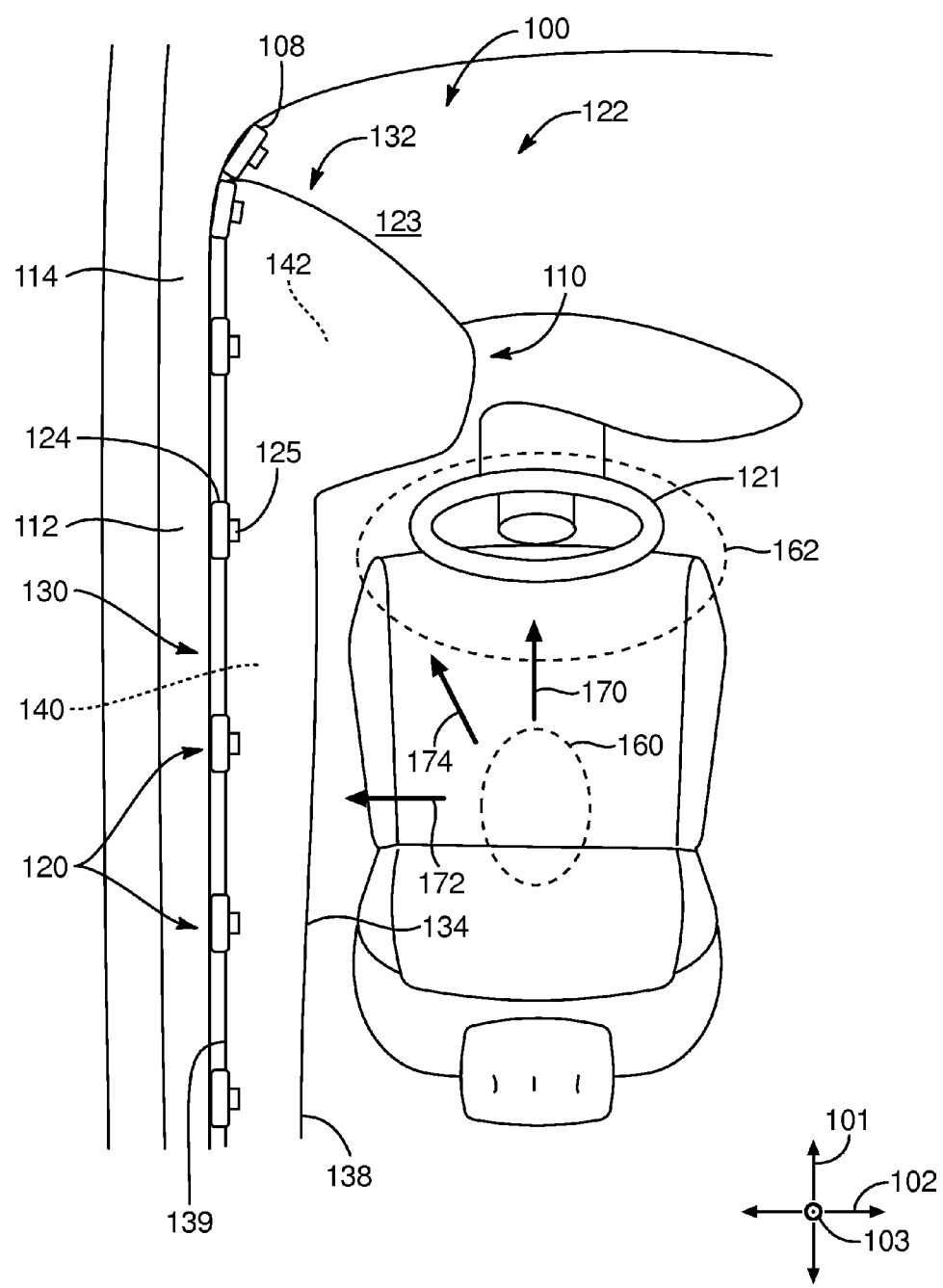
FIG. 3 is a top view of the airbag assembly of FIG. 2, wherein the inflatable curtain airbag is in the deployed configuration.

The inflatable curtain airbag 110 may be generally formed from two pieces of flexible material such as a fabric or thin polymer, and may include an inboard section 138 and an outboard section 139 (visible in FIG. 3). According to one example, the inflatable curtain airbag 110 is generally made from a woven nylon fabric, but other fabrics or flexible materials may be used. The inboard section 138 and the outboard section 139 may be separate pieces of fabric, or may be sections of a single piece of fabric folded together. The inboard section 138 and the outboard section 139 may be secured together via peripheral stitching 144, as shown. In the alternative, the inboard section 138 and the outboard section 139 may be secured together via mechanical fastening, adhesives, one-piece weaving, RF welding, ultrasonic welding, or any other suitable method known in the art.

The inboard section 138 and the outboard section 139 of the inflatable curtain airbag 110 may define a first interior chamber, or a first chamber 140, within the first protection zone 130 and a second interior chamber, or second chamber 142, within the second protection zone 132. A "chamber" may be defined as an interior cavity within a body. Also, throughout this disclosure, the internal cavities that are designated as "chambers" will have dashed reference number lead lines to indicate that the chamber is interior to the inboard and outboard sections 138, 139 of the inflatable curtain airbag. The first chamber 140 may receive inflation gas from the inflator 104 via the fill tube 106. The second chamber 142 may receive inflation gas from the first chamber 140. As shown, the first chamber 140 may be divided into inflation cells 146 via interior stitching 148. Dividing the inflatable curtain airbag 110 into inflation cells 146 is designed to maximize cushioning protection while minimizing the volume of inflation gas required to provide optimum protection to occupants.

Referring to FIG. 3, a top view illustrates the airbag assembly 100 with the inflatable curtain airbag 110 in the deployed configuration. Additionally, FIG. 3 illustrates an occupant zone 160 that would ordinarily be occupied by a vehicle occupant's head, or more specifically, the driver's head, along with a deployed position 162 of an exemplary driver's side airbag. In this context, "side" refers not to lateral impact, but to a frontal impact cushion positioned on the driver's side of the vehicle, as opposed to a "passenger's side airbag," which is a frontal impact airbag positioned on the passenger's side of the vehicle.

Additionally, FIG. 3 shows a forward trajectory 170, an outboard trajectory 172, and a forward outboard trajectory 174 of the occupant's head relative to the vehicle. The forward trajectory 170 is where the head may move from the occupant zone 160 during an ordinary (i.e., not small overlap or oblique) frontal collision. The outboard trajectory 172 is where the head may move from the occupant zone 160 during a side impact, such as an impact against the side of the vehicle along which the inflatable curtain airbag 110 inflates. The forward outboard trajectory 174 is where the head may move from the occupant zone 160 during a small overlap or oblique collision.

As shown, the forward outboard trajectory 174 results from a rotation of the vehicle caused by the small overlap or oblique collision and may tend to move the occupant's head outboard of the steering wheel 121 to impact the A-pillar 114 and/or the outboard portion 123 of the instrument panel 122. The presence of the second protection zone 132 may serve to protect the head from such an impact. Thus, the second protection zone 132 may enable the airbag assembly 100 to provide enhanced protection in the event of a rollover or small overlap or oblique collision.

Depending on the layout of the interior stitching 148, the second protection zone 132 may inflate generally simultaneously with the first protection zone 130, or may only inflate after inflation of the first protection zone 130 has substantially completed. If the interior stitching 148, or more specifically, a chamber divider 150 of the interior stitching 148, is positioned to restrict inflation gas flow from the first protection zone 130 into the second protection zone 132, inflation of the second protection zone 132 may be delayed to the extent desired.

The second protection zone 132 may interact with the various interior structures of the vehicle, such as the A-pillar 114, the instrument panel 122, and the steering wheel 121. For example, the second protection zone 132 may butt up against any of these structures during deployment to provide some frictional engagement that helps the second protection zone 132 to remain in place during the potential impact of the occupant's head with the second protection zone 132.

The airbag assembly 100 is shown in use on the driver's side of the vehicle. A similarly configured (i.e., mirror image or near-mirror image) airbag assembly may be used on the passenger's side of the vehicle in addition or in the alternative to the airbag assembly 100. Such an airbag assembly may have a second protection zone similar to the second protection zone 132 to protect the front passenger from impact against the interior surfaces that correspond to the A-pillar 114, the steering wheel 121, and the outboard portion 123 of the instrument panel 122. For example, the passenger's side may have an A-pillar, glove compartment, dashboard, and/or instrument panel that may be beneficially covered by such a second protection zone. The various exemplary embodiments disclosed herein may have equal application to the passenger's side as to the driver's side.

The configuration of the airbag assembly 100 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

In the embodiment of FIGS. 1-3, the second protection zone 132 may generally be stowed within the trim attached to the A-pillar 114. This may be suitable for some vehicles. However, in some embodiments, it may be desirable to minimize the airbag structure stowed on and/or secured to the A-pillar 114. Some vehicles, and in particular, compact cars, may have very limited space within the trim attached to the A-pillar 114. Additionally, it may be desirable to minimize the risk that any A-pillar trim elements or other components will be projected into the vehicle interior during deployment. Hence, in alternative embodiments, the second protection zone may be stored elsewhere.

Figure 4:
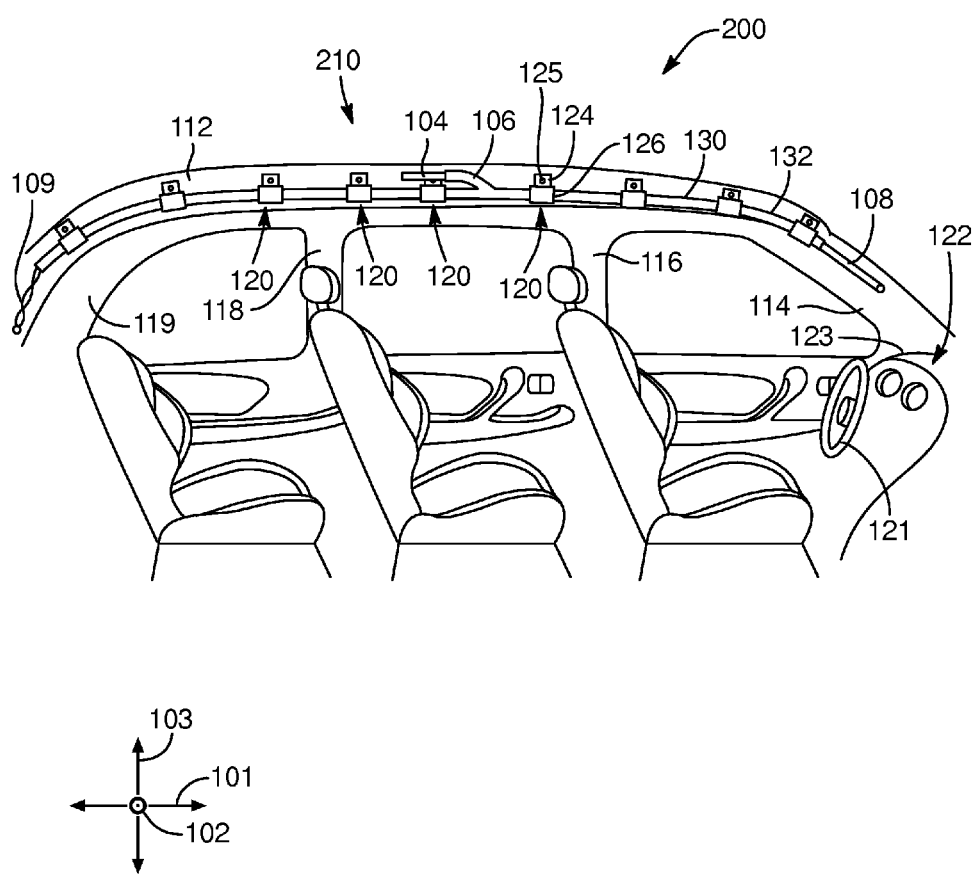
FIG. 4 is a side elevation view of an airbag assembly in a stowed configuration within a vehicle according to one alternative exemplary embodiment of the invention.

Referring to FIG. 4, a side elevation view illustrates an airbag assembly 200 according to an alternative exemplary embodiment of the invention, with an inflatable curtain airbag 210 in a stowed configuration within a vehicle. Like the airbag assembly 100, the airbag assembly 200 may include an inflator 104 connected to the inflatable curtain airbag 210 via a tube 106, and a forward tether 208 and a rearward tether 109 that cooperate to provide tension to keep the inflatable curtain airbag 210 in position upon deployment. The inflatable curtain airbag 210 may be secured to the roof rail 112 via a plurality of mounting assemblies 120, each of which may include a tab 124, a fastener 125, and a wrapper 126. As in the previous embodiment, the wrappers 126 may break open during initial inflation of the inflatable curtain airbag 210 to permit deployment of the inflatable curtain airbag 210.

The inflatable curtain airbag 210 may be designed to minimize the need for storage of or attachment of airbag components to the A-pillar 114. Thus, the inflatable curtain airbag 210 may have a design in which the portions of the inflatable curtain airbag 210 that deploy forward of the steering wheel 121 are positioned adjacent to the forward portion of the roof rail 112 rather than stored within the trim on the A-pillar 114. More specifically, the inflatable curtain airbag 210 may have a first protection zone 230 that deploys generally rearward of the steering wheel 121, and a second protection zone 232 that deploys generally forward of the steering wheel 121.

In the stowed configuration, the second protection zone 232 may be folded rearward to overlie the first protection zone 230. The term "overlie" refers to two objects with outward-facing surfaces that are positioned against each other. In the embodiment of FIG. 4, the second protection zone 232 may be double-folded against the first protection zone 230 in a manner that will be set forth in greater detail in the description of FIGS. 6-8.

Due to the manner in which the second protection zone 232 is folded against the first protection zone 230, the package defined by the inflatable curtain airbag 210 in the stowed configuration of FIG. 4 may be somewhat larger proximate the forward portion of the roof rail 112 than that of the inflatable curtain airbag 110 of the previous embodiment. None of the mounting assemblies 120 need be secured to the A-pillar 114. This leaves the A-pillar 114 free of airbag components apart from the forward tether 208. This may minimize the bulk of material stored within the trim on the A-pillar 114. Further, such a configuration may enhance the overall safety level of the airbag assembly 200 by reducing the risk of airbag components being projected from the A-pillar or the A-pillar trim during deployment of the airbag assembly 200.

Figure 5:
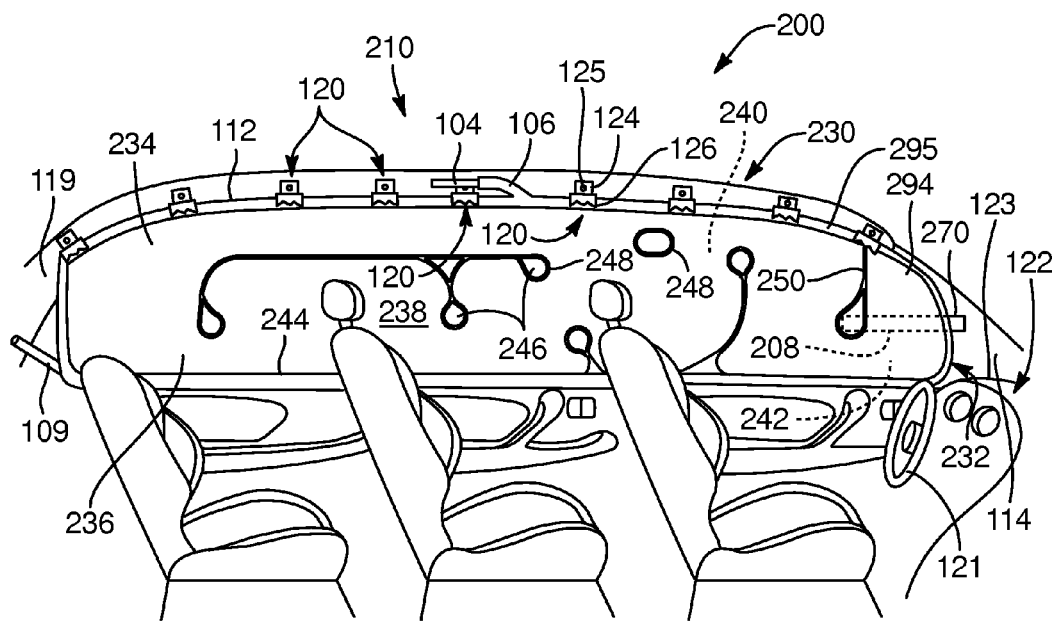
FIG. 5 is a side elevation view of the airbag assembly of FIG. 4, wherein the inflatable curtain airbag is in a deployed configuration.
Figure 5:
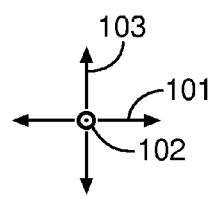

Referring to FIG. 5, a side elevation view illustrates the airbag assembly 200 of FIG. 4, with the inflatable curtain airbag 210 in the deployed configuration. Deployment may initially occur substantially as set forth above in the description of the airbag assembly 100 of FIGS. 1-3. Thus, as shown, the wrappers 126 may break open to release the inflatable curtain airbag 210, and the inflatable curtain airbag 210 may extend downward to protect occupants of the vehicle from impact against the lateral surfaces of vehicle.

As shown, the inflatable curtain airbag 210 has a configuration generally similar to that of the inflatable curtain airbag 110, with some differences. The inflatable curtain airbag 210 may have an upper portion 234 and a lower portion 236. The inflatable curtain airbag 210 may be formed by an inboard section 238 and an outboard section 239 (obscured from view, but shown in FIG. 7) that are secured together through any of the methods mentioned previously with peripheral stitching 244 and interior stitching 248. The inboard section 238 and the outboard section 239 may cooperate to define a first chamber 240 within the first protection zone 230 and a second chamber 242 within the second protection zone 232. The boundaries of the first chamber 240 and the second chamber 242 may be defined by the geometry of the peripheral stitching 244 and the interior stitching 248.

The inflatable curtain airbag 210 may not have inflation cells like the inflation cells 146 of the previous embodiment, but may, instead, have a plurality of non-inflating regions 246 defined by the interior stitching 248. The non-inflating regions 246 may be positioned proximate areas where impact from a vehicle occupant is unlikely, or where it is desirable to attach a tether or another airbag component. Such attachment may beneficially be done at the non-inflating regions 246 because the attachment can be carried out through the inboard section 238 and the outboard section 239 without impeding the inflation of the inflatable curtain airbag 210. The non-inflating regions 246 may also serve to reduce the volume of the inflatable curtain airbag 210 in the deployed configuration, thereby reducing the amount of inflation gas required, and thence, the size of the inflator 104.

A chamber divider 250 of the interior stitching 248 may be positioned between the first protection zone 230 and the second protection zone 232, and may thus separate the first chamber 240 from the second chamber 242. The chamber divider 250 may restrict the flow of inflation gas from the first chamber 240 into the second chamber 242, and may thus cause the first protection zone 230 to inflate generally prior to inflation of the second protection zone 232.

The second protection zone 232 may be much different from the second protection zone 132 of the previous embodiment in that the second protection zone 232 may be much more compact, and may be relatively narrow when deployed. This may help ensure that the inflatable curtain airbag 210, and particularly the enlarged, forward portion of the inflatable curtain airbag 210 where the second protection zone 232 overlies the first protection zone 230, compacts into the space provided for it in the trim for the roof rail 112.

During deployment, the inflation of the first protection zone 230 and the second protection zone 232 may cause the second protection zone 232 to generally pivot forward from its stowed position overlying the first protection zone 230. Thus, the second protection zone 232 may first pivot inboard until it extends in the lateral direction 102, wherein it is generally perpendicular to the first protection zone 230. From this position, the second protection zone 232 may continue to pivot forward, but now may pivot outboard. If left unchecked, this motion may continue until the second protection zone 232 is generally parallel to the first protection zone 230. The level of tension exerted by the forward tether 208 on the second protection zone 232 may generally control the angle at which the second protection zone 232 is positioned upon full deployment of the inflatable curtain airbag 210.

If the second protection zone 232 fully unfolds, i.e., pivots outboard until it is generally parallel to the first protection zone 230, it may be in a position suitable for providing supplemental side impact and rollover protection, but may no longer be optimally positioned to prevent impact of the occupant in the event of a small overlap or oblique collision. The angle to which the second protection zone 232 unfolds relative to the first protection zone 230 may be adapted to the type of protection that is most desired. The airbag assembly 200 of FIG. 4 may be designed generally to provide enhanced side impact and/or rollover protection, and may thus be designed to allow the second protection zone 232 to unfold to a position generally parallel to the first protection zone. Configurations that are more adapted to small overlap or oblique collision protection will be shown and described in connection with FIGS. 10-15.

The second protection zone 232 may advantageously extend to a height proximate the roof of the vehicle. As a result, after deployment, a top edge 294 of the second protection zone 232 may be positioned proximate to and/or parallel to the roof of the vehicle. This may enable the second protection zone 232 to provide protection for taller individuals, and may also help the second protection zone 232 to cushion against impact with the higher lateral surfaces of the vehicle such as the upper portion of the A-pillar 114. Further, the height of the second protection zone 232 may be needed to effectively block the gap that may otherwise exist between the first protection zone 230 and the driver's side airbag, as illustrated at 162 of FIG. 3. A second protection zone (not shown) with a lower top edge may, when inflated, may leave a gap between its top edge and the roof of the window, through which a person's body part may pass to contact the lateral surfaces and/or the instrument panel 122.

Further, the relative height of the second protection zone 232 may provide more effective cushioning because it may be positioned relatively closer to the part of the vehicle occupant needing protection (such as the head) than a similar cushion of lower height. This positioning may enable the second protection zone 232 to receive the body part earlier, and retard its motion over a greater distance, thereby providing gentler cushioning. Yet further, the height of the second protection zone 232 may enable the top edge 294 to engage interior components of the vehicle, such as the roof, headliner trim, and/or windshield, in a manner that helps properly position the second protection zone 232 and/or keep the second protection zone 232 in place as it receives contact from an occupant. Orientation of the top edge 294 generally parallel to the roof of the vehicle may enhance many of the benefits provided by the height of the second protection zone 232.

Figure 6:
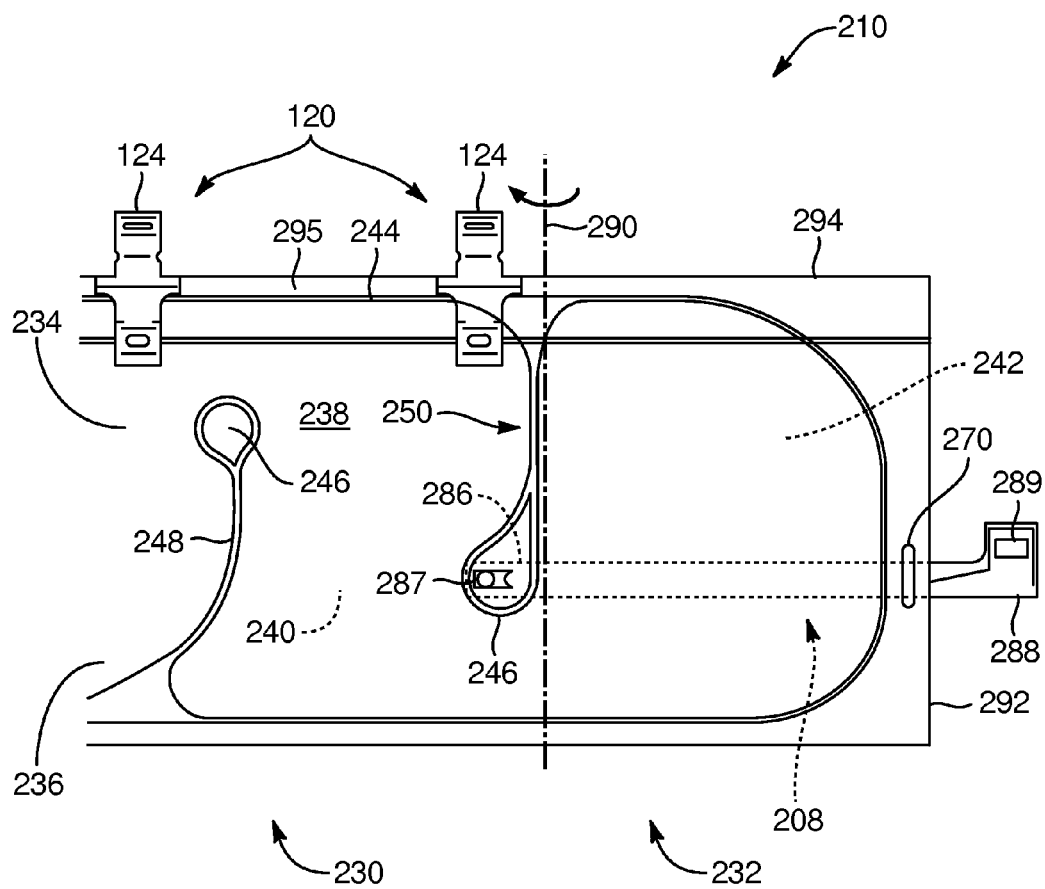
FIG. 6 is a side elevation view of the forward portion of the inflatable curtain airbag of the airbag assembly of FIG. 4, prior to compaction of the inflatable curtain airbag into the stowed configuration.

Referring to FIG. 6, a side elevation view illustrates the forward portion of the inflatable curtain airbag 210 of the airbag assembly 200 of FIG. 4, prior to compaction of the inflatable curtain airbag 210 into the stowed configuration. The second protection zone 232 may have a forward edge 292 in addition to the top edge 294. The top edge 294 may extend parallel to a top edge 295 of the first protection zone 230, and may be of a same height with the top edge 295 upon inflation of the inflatable curtain airbag 210. Thus, the top edge 294 of the second protection zone 232 and the top edge 295 of the first protection zone 230 may cooperate to define a single substantially straight, continuous top edge of the inflatable curtain airbag 210.

As shown, the chamber divider 250 may extend along most of the height of the inflatable curtain airbag 210 between the first chamber 240 and the second chamber 242. The forward tether 208 may have a first end 286 secured to the inflatable curtain airbag 210 and a second end 288 securable to the vehicle. The first end 286 may be secured to the chamber divider 250, and more specifically, may be secured to a non-inflating region 246 that extends from the remainder of the chamber divider 250. The first end 286 may be secured to the region 246 via stitching 287. The second end 288 may have an attachment feature 289 that facilitates attachment of the second end 288 to the A-pillar 114, for example, through the use of a fastener, adhesive, stitching, or other mechanism known in the art (not shown).

The chamber divider 250 may also form a natural fold line, e.g., a "deployed fold line," where, in the deployed configuration, the inflatable curtain airbag 210 is able to remain partially folded. It may be difficult to fold the inflatable curtain airbag 210 at other locations because the pressure of the inflation gas within the inflatable curtain airbag 210 and the manner in which the inflatable curtain airbag 210 bulges outward in the lateral direction 102 may tend to keep most regions of the inflatable curtain airbag 210 from bending away from the longitudinal direction 101. However, as the chamber divider 250 may extend along most of the height of the inflatable curtain airbag 210, the chamber divider 250 may provide a natural fold line.

The second chamber 242 of the second protection zone 232, as shown, is a single chamber. However, it should be understood that the second chamber 242 could be divided into multiple chambers without departing from the spirit of the invention. For example, the second chamber 242 could be divided into two adjacent chambers, a forward most chamber and an intermediate chamber. The intermediate chamber could have the chamber divider 250 at one side and the divider between the forward most chamber and the intermediate chamber at the other side. An airbag configuration with an intermediate chamber and a forward most chamber may align better along the contour of the side door, A-pillar, and instrument panel. One embodiment of the invention could have the intermediate chamber positioned to cushion the vehicle occupant from impacting the A-pillar and the forward most chamber positioned to cushion the vehicle occupant from impacting the instrument panel. Of course, a person of skill in the art, armed with the present disclosure, could determine a configuration using multiple chambers that would protect a vehicle occupant for a particular vehicle configuration.

The inflatable curtain airbag 210 may be folded at a first stowed fold line 290 to compact it into the stowed configuration. As shown in FIG. 6, the first stowed fold line 290 is the same as the natural fold line, and is thus defined by the chamber divider 250. In alternative embodiments, the inflatable curtain airbag 210 may be folded at a different location, i.e., either forward or rearward of the chamber divider 250. The location of the stowed fold line may have little impact on the deployed configuration of the inflatable curtain airbag 210 because the chamber divider 250 may determine where the fold is located in the deployed configuration.

The attachment location of the first end 286 of the forward tether 208 may be selected to provide the desired level of tension on the second protection zone 232. More specifically, securing the first end 286 forward of the chamber divider 250 may cause the forward tether 208 to exert tension in the longitudinal direction 101 on not only the first protection zone 230, but on the second protection zone 232 as well. Such tension may help unfold the second protection zone 232 by helping pivot the second protection zone 232 forward during deployment, but may also act to draw the second protection zone 232 toward a position in which the second protection zone 232 is parallel to the first protection zone 230. As set forth above, this may be desirable depending on the type of protection the airbag assembly 200 is to provide.

Securing the first end 286 rearward of the chamber divider 250 may cause the forward tether 208 to exert tension in the longitudinal direction 101 on only the first protection zone 230. Securing the first end 286 directly on the chamber divider 250, or forward of, but close to, the chamber divider 250, may cause the forward tether 208 to exert some level of tension on the second protection zone 232, but with a short moment arm so that the resulting moment tending to pivot the second protection zone 232 forward is relatively small.

Hence, the attachment point of the first end 286 may be carefully selected to obtain the desired balance between expeditious deployment of the second protection zone 232 and maintenance of the second protection zone 232 at the proper orientation to provide the desired protection. In the embodiment of FIG. 6, the first end 286 may be secured to the non-inflating region 246 of the chamber divider 250, which extends generally rearward of the remainder of the chamber divider 250. Thus, as configured in FIG. 6, the forward tether 208 may exert little, if any, longitudinal tension on the second protection zone 232.

The second protection zone 232 may have an opening 270 proximate the forward edge 292 of the second protection zone 232. The opening 270 may have an elongated shape as shown, so that the opening 270 generally defines a slot. Prior to installation in the vehicle, the forward tether 208 may be inserted through the opening 270. The forward tether 208 may be inserted into the opening 270 prior to folding the second protection zone 232 against the first protection zone 230. However, it may be easier to insert the forward tether 208 through the opening 270 after second protection zone 232 has been fully folded against the first protection zone 230.

According to one example, the inflatable curtain airbag 210 may first be folded inboard at the first stowed fold line 290, with the forward tether 208 free of the opening 270. Thus, the forward edge 292 may be brought inboard, or out of the page with reference to the view of FIG. 6, and then brought rearward (or to the left in the view of FIG. 6) until the forward edge 292 overlies the corresponding region of the first protection zone 230. The first stowed fold line 290 may then be the forward edge of the inflatable curtain airbag 210.

Figure 7:
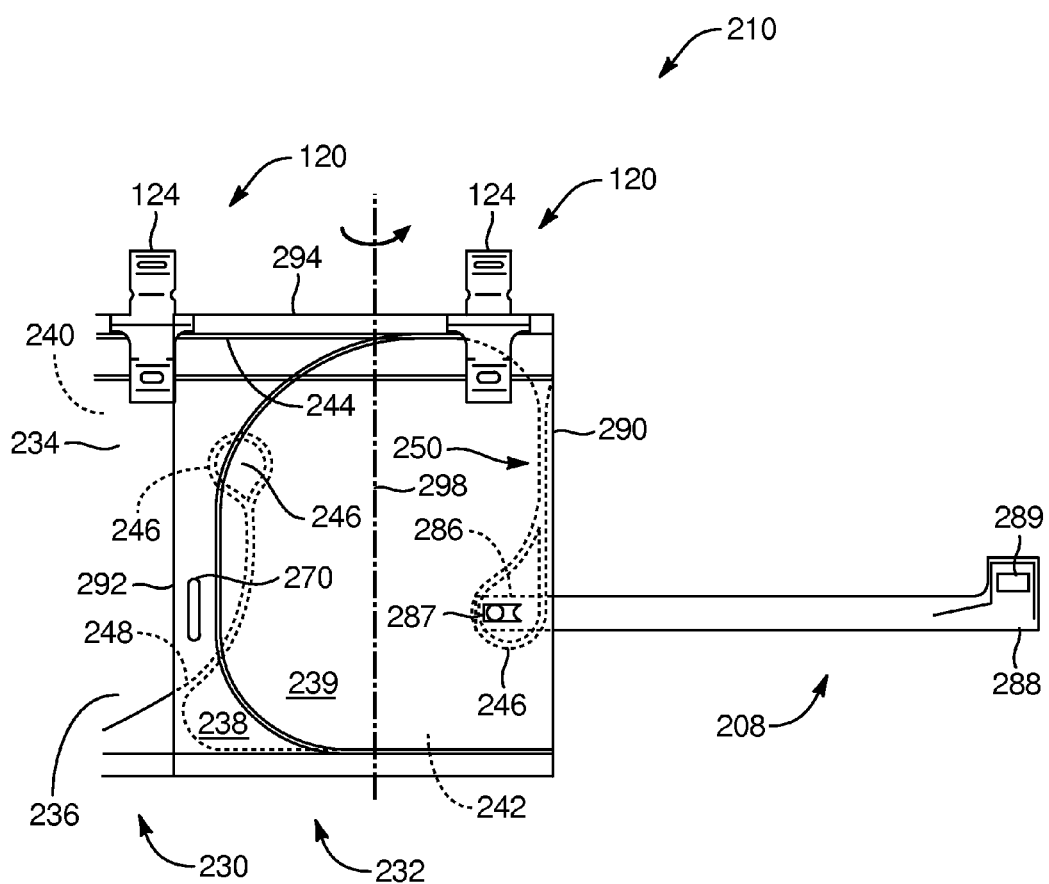
FIG. 7 is a side elevation view of the forward portion of the inflatable curtain airbag assembly of FIG. 4, after folding of the second protection zone rearward to overlie the forward portion of the first protection zone.

Referring to FIG. 7, a side elevation view illustrates the forward portion of the inflatable curtain airbag 210 of the airbag assembly 200 of FIG. 4 after the second protection zone 232 has been folded against the first protection zone 230 in the manner described in the description of FIG. 6, but prior to the performance of additional folding steps. As shown, the forward tether 208 may remain outside the opening 270 at this stage.

The second protection zone 232 may then be folded again at a second stowed fold line 298. This may be done by bringing the forward edge 292 inboard again, and this time forward (or to the right in the view of FIG. 7) until the forward edge is positioned forward (i.e., to the right) of the first stowed fold line 290. Thus, the forward edge 292 may once again be the forward-most feature of the inflatable curtain airbag 210. The resulting configuration is shown in FIG. 8.

Figure 8:
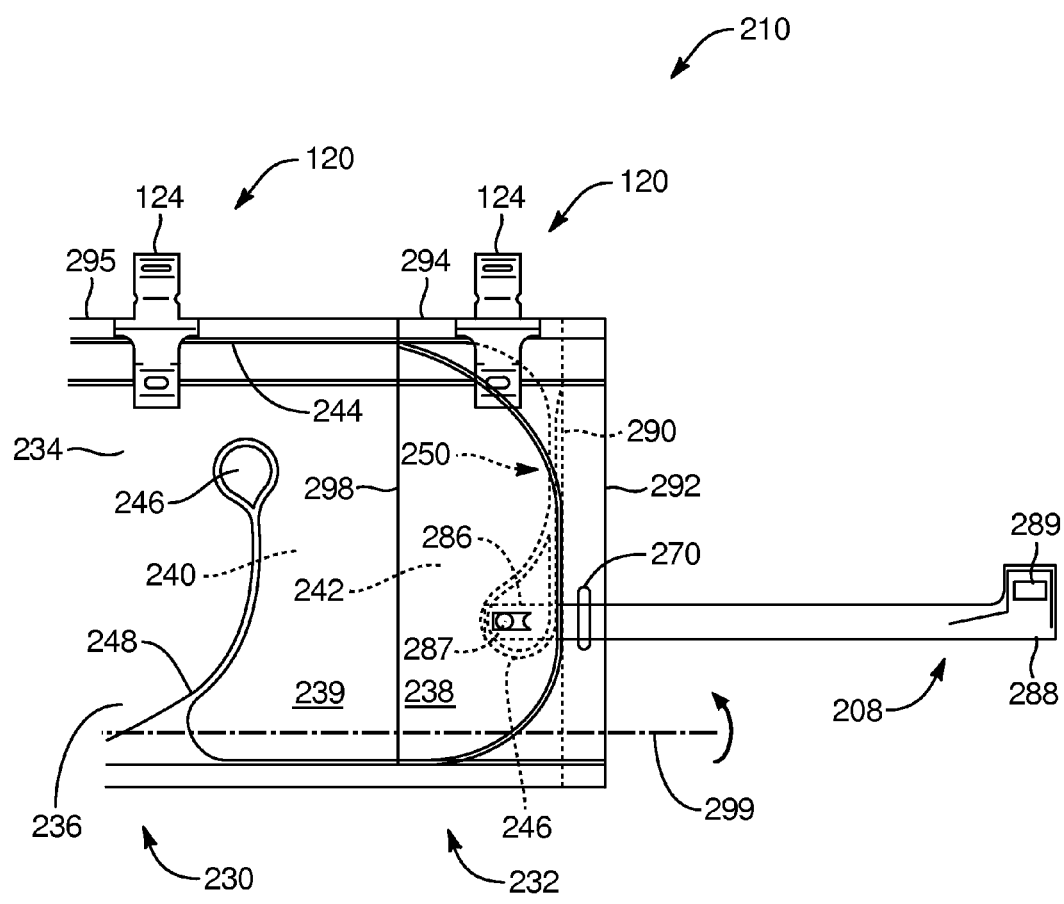
FIG. 8 is a side elevation view of the forward portion of the inflatable curtain airbag assembly of FIG. 4, after secondary folding of the second protection zone.

Referring to FIG. 8, a side elevation view illustrates the forward portion of the inflatable curtain airbag 210 of the airbag assembly 200 of FIG. 4 after the second protection zone 232 has been folded forward in the manner described in the description of FIG. 7, but prior to the performance of additional folding steps. The forward edge 292 of the second protection zone 232 may protrude beyond the first stowed fold line 290, leaving the opening 270 relatively accessible. Thus, the second end 288 may easily be inserted through the opening 270 at this stage. Alternatively, the second end 288 may be inserted through the opening 270 after the inflatable curtain airbag 210 has been compacted in the transverse direction 103.

At the outset of the compaction stage illustrated in FIG. 8, the inflatable curtain airbag 210 may have a Z-shaped configuration as viewed from along the first stowed fold line 290 and the second stowed fold line 298. During deployment, the inflatable curtain airbag 210 may generally expand along the transverse direction 103 prior to unfolding of the second protection zone 232 from the first protection zone 230. Thus, the view of FIG. 8 may be similar to the appearance of the inflatable curtain airbag 210 part way through the deployment process, i.e., when the first protection zone 230 has substantially deployed, but the second protection zone 232 has not yet done so.

The Z-shaped fold of FIG. 8 may advantageously help to control the deployment of the second protection zone 232 by causing the second protection zone 232 to move forward generally prior to moving inboard. In the vehicle, the second protection zone 232 may be positioned near a location directly outboard of the occupant zone 160. It may not be desirable for the second protection zone 232 to contact the occupant during deployment. Thus, it may be advantageous to have the second protection zone 232 unfold generally forward before it moves inboard.

The Z-shaped fold may encourage such early forward motion because it may cause the inflatable curtain airbag 210 to unfold first at the first stowed fold line 290 as inflation gas passes through the first stowed fold line 290 and into the second chamber 242. As the second protection zone 232 begins to unfold from the first protection zone 230 at the first stowed fold line 290, the second stowed fold line 298 may swing inboard, but the forward edge 292 may tend to move outboard. The second stowed fold line 298 may begin to unfold when the portion of the second protection zone 232 between the first stowed fold line 290 and the second stowed fold line 298 is already oriented generally forward (i.e., the second stowed fold line 298 is forward of the first stowed fold line 290). This may help avoid contact of the occupant with the second protection zone 232 during deployment.

The interaction of the forward tether 208 with the opening 270 may further help the second protection zone 232 inflate forward. More precisely, the forward edge 292 may be kept outboard by the engagement of the forward tether 208 with the opening 270. The opening 270 may slide forward along the forward tether 208 toward the second end 288. Thus, the second protection zone 232 may be constrained to inflate along a generally forward trajectory. If desired, a grommet or other interface that facilitates sliding may be installed in the opening 270 to ensure that the opening 270 is able to slide relatively freely along the forward tether 208.

Consequently, the forward tether 208 may act as a restraint member for the second protection zone 232. A "restraint member" may be defined as any object that serves to limit the position and/or orientation of a second object. A restraint member may be secured to the object it affects, or may simply be positioned to abut or otherwise receive contact from it. In alternative exemplary embodiments, such a restraint member may have a variety of configurations including flexible members such as cords or tethers, or rigid members such as rails, brackets, or the like. A rail (not shown) may have a sliding element such as a ring connected to the cushion, and may be secured proximate the roof of the vehicle to limit inboard motion and/or encourage outboard motion of the second protection zone 232. A bracket (not shown) or other hard stop may deploy downward from the vehicle roof to directly block forward and/or outboard motion of the second protection zone 232. Those of skill in the art will recognize that many other alternative devices may be used to restrict forward and/or outboard motion of the second protection zone 232.

After the inflatable curtain airbag 210 has been folded in the longitudinal direction 101, the inflatable curtain airbag 210 may be rolled, folded, or otherwise compacted in the transverse direction 103. This may be accomplished, for example, by rolling the inflatable curtain airbag 210 about a transverse compaction axis 299. Alternatively, the inflatable curtain airbag 210 may be compacted along the transverse direction 103 by folding the inflatable curtain airbag 210 about the transverse compaction axis 299 (for example, with a Z-fold), or using other known methods to compact the inflatable curtain airbag 210 along the transverse direction 103.

This compaction may provide the generally elongated shape of the inflatable curtain airbag 210 in the stowed configuration. With the inflatable curtain airbag 210 in the stowed configuration, the mounting assemblies 120 may easily be secured to the roof rail 112 to install the inflatable curtain airbag 210 in the vehicle. As mentioned previously, none of the mounting assemblies 120 need be secured to the A-pillar 114.

Figure 9:
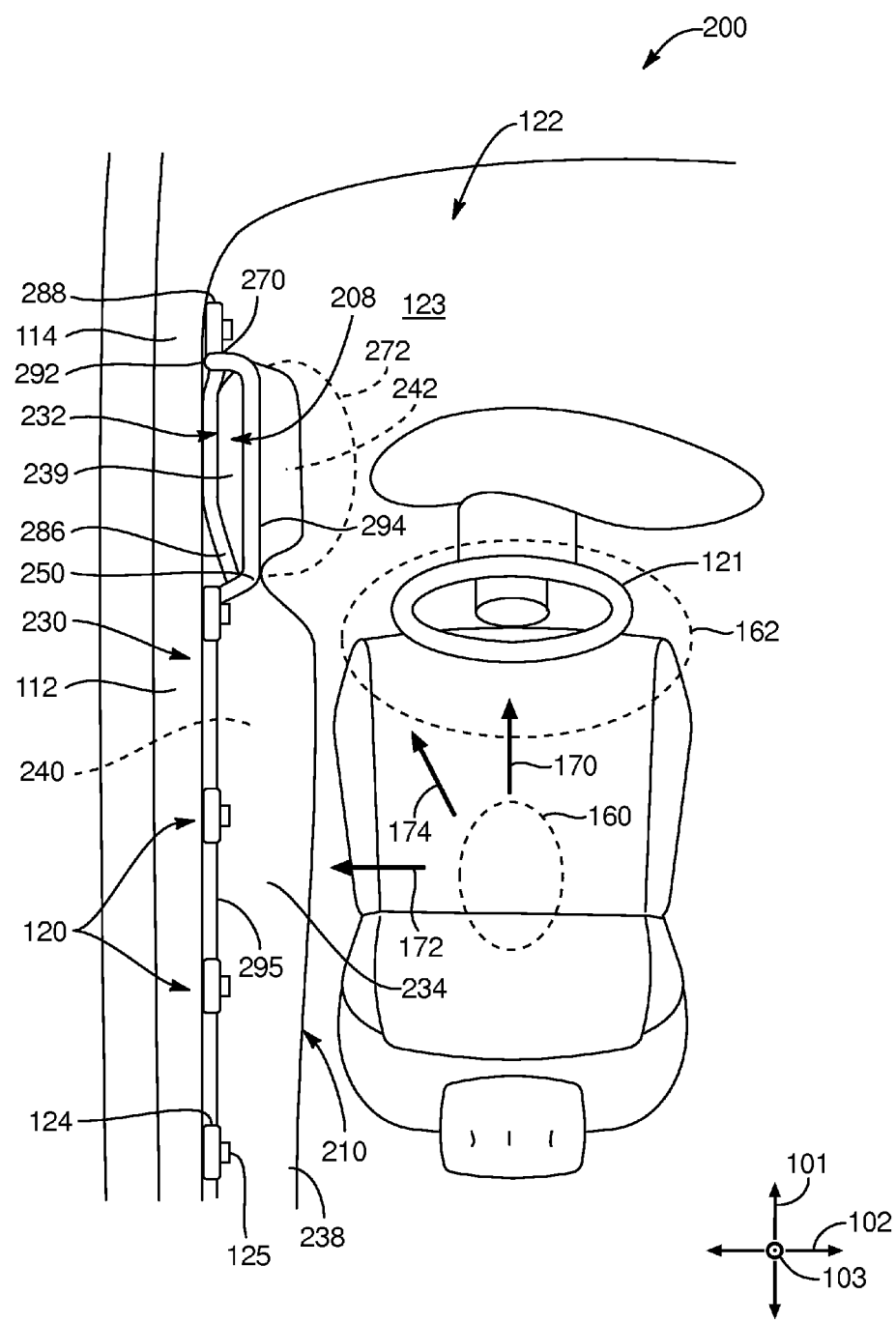
FIG. 9 is a top view of the airbag assembly of FIG. 4, wherein the inflatable curtain airbag is in the deployed configuration.

Referring to FIG. 9, a top view illustrates the airbag assembly 200 of FIG. 4, wherein the inflatable curtain airbag 210 is in the deployed configuration in response to a side impact or rollover collision. The inflatable curtain airbag 210 has inflated such that the first protection zone 230 has inflated. The second protection zone 232 has unfolded as described above and has also inflated along a trajectory oriented generally forward from the first protection zone 230. More specifically, the forward edge 292 has slid along the length of the forward tether 208 so that the forward edge 292 is now proximate the second end 288 of the forward tether 208. The forward tether 208 may act to exert some tension in the longitudinal direction 101 on the second protection zone 232 to unfold the second protection zone 232 and/or keep the second protection zone 232 unfolded at an angle approaching 180° relative to the first protection zone 230.

The second protection zone 232 may have unfolded to a position substantially parallel to the first protection zone 230. Such a position may be beneficial for providing supplemental side impact and/or rollover protection by protecting vehicle occupants from impact against the lateral surfaces of the vehicle that lie outboard of the second protection zone 232. Such a position may also be used for small overlap or oblique protection, for example, by providing a second protection zone 232 with an enlarged configuration 272. Such a configuration may allow the second protection zone 232, in the deployed configuration, to extend significantly inboard to help block the space that may otherwise exist between the first protection zone 230 and the position 162 of the driver's side airbag.

Advantageously, the forward tether 208 may pass only through the opening 270. This may provide for relatively free inboard inflation of the second protection zone 232. Additionally, routing the forward tether 208 through only a single opening may serve to simplify the construction and compaction of the inflatable curtain airbag 210.

Enlarging the second protection zone may carry some disadvantages, such as a significant addition to the overall size and profile of the airbag assembly 200. In other embodiments, it may be desirable to provide an inflatable curtain airbag with second protection zone that unfolds to an angle of less than 180° relative to the first protection zone, as viewed from the top, in the event of a small overlap or oblique collision. One such embodiment will be shown and described in FIGS. 10-12, as follows.

Figure 10:
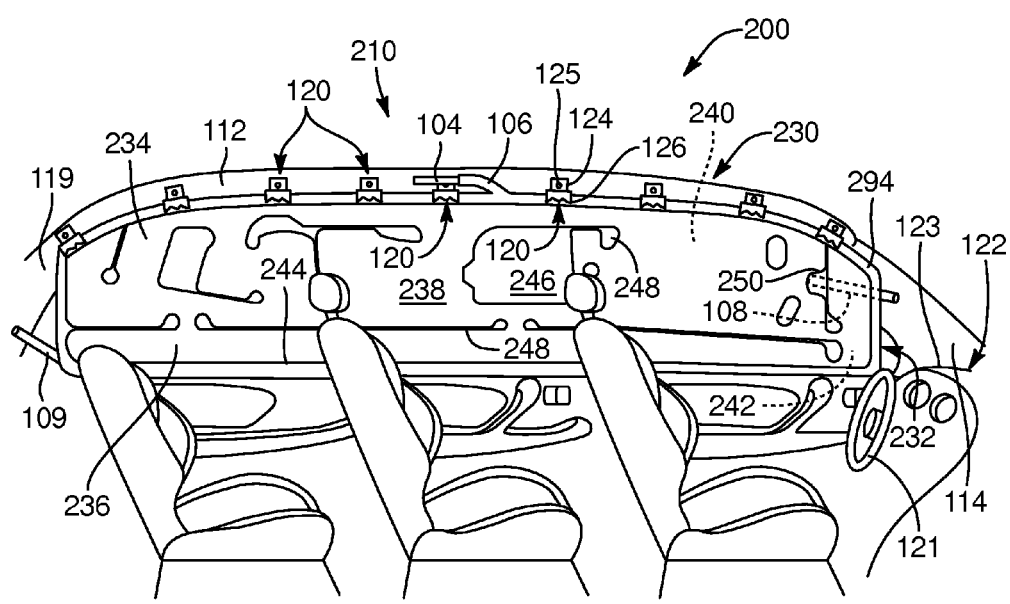
FIG. 10 is a side elevation view of an airbag assembly according to another alternative embodiment of the invention, with the inflatable curtain airbag is in a deployed configuration.
Figure 10:
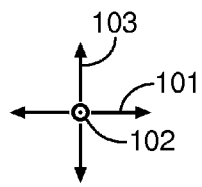

Referring to FIG. 10, a side elevation view illustrates an airbag assembly 300 according to another alternative embodiment of the invention. The airbag assembly 300 may have an inflatable curtain airbag 210, inflator 104, tube 106, and rearward tether 109 that are substantially the same as those of the previous embodiment. However, the airbag assembly 300 may have a forward tether 308 and a restraint member in the form of a first tether 380 that serve to restrain or control deployment of the second protection zone 232 in a manner different from the forward tether 108 of the previous embodiment.

More specifically, the first tether 380 may be secured to the forward tether 308. The first tether 380, rather than the forward tether 308, may pass through the opening 270. The forward tether 308 may provide longitudinal tension to the inflatable curtain airbag 210 as set forth in the discussion of previous embodiments, and the first tether 380 may provide restraint for the second protection zone 232 that enables the second protection zone 232 to be angled inboard relative to the first protection zone 230 to provide small overlap or oblique protection without the need for additional bulk.

Figure 11:
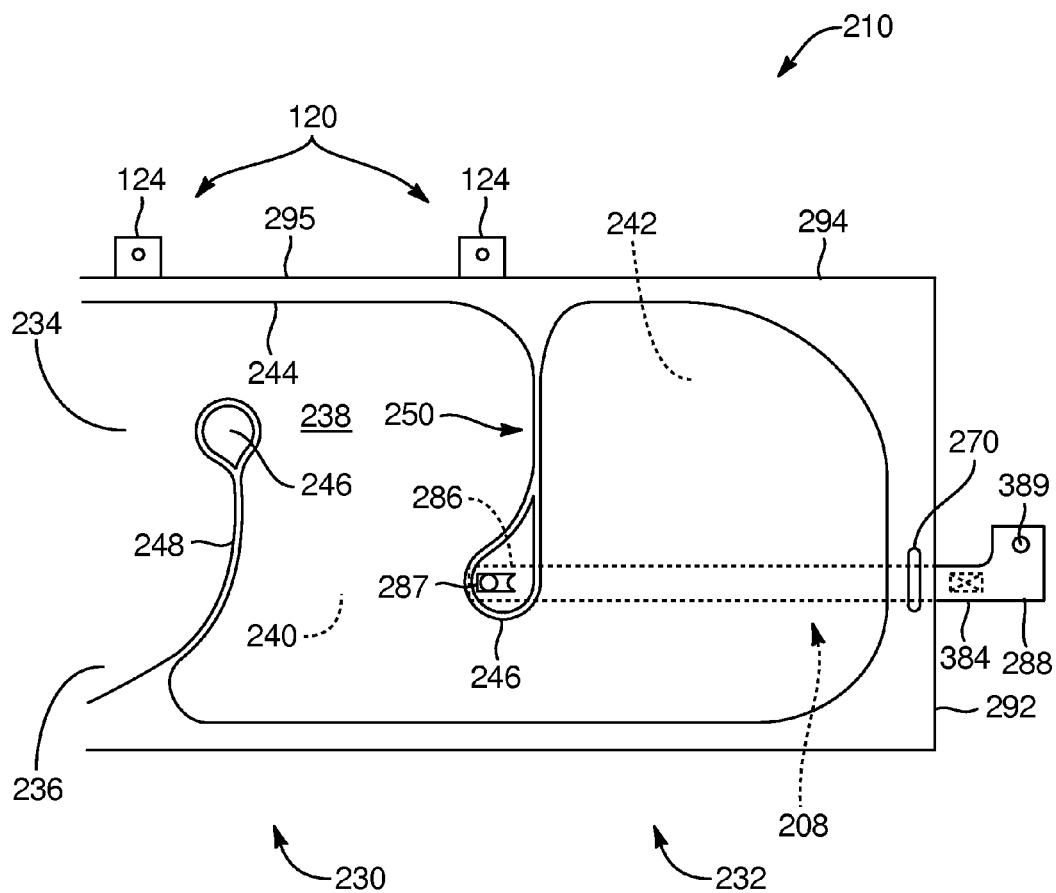
FIG. 11 is a side elevation view of the forward portion of the inflatable curtain airbag of the airbag assembly of FIG. 10, prior to compaction of the inflatable curtain airbag into the stowed configuration.

Referring to FIG. 11, a side elevation view illustrates the forward portion of the inflatable curtain airbag 210 of the airbag assembly 200 of FIG. 10, prior to compaction of the inflatable curtain airbag 210 into the stowed configuration. As shown, the forward tether 308 has a first end 286 secured to the non-inflating region 246 of the chamber divider 250 in a manner similar to that of the previous embodiment. The forward tether 308 also has a second end 288 with an attachment feature 389 designed to be secured the A-pillar 114 of the vehicle. The attachment feature 389 may be a hole as shown, or may be stitching or some other attachment device.

The first tether 380 may have a first end 382, a second end 384, and an intermediate portion 386 between the first end 382 and the second end 384. The first end 382 and the second end 384 may each be secured to the forward tether 308, for example, via stitching 385. The first end 382 and the second end 384 may be secured at a wide variety of locations on the forward tether 308. As shown in FIG. 11, the first end 382 may be secured to a location proximate a midpoint of the forward tether 308 (i.e., a location roughly halfway between the first end 286 and the second end 288 of the forward tether 308). The second end 384 may be secured to a location proximate the second end 288 of the forward tether 308. The intermediate portion 386 may pass through the opening 270.

The inflatable curtain airbag 210 may be compacted substantially as set forth in the discussion of FIGS. 6-8 regarding compaction of the inflatable curtain airbag 210 in the previous embodiment. However, the inflatable curtain airbag 210 of the airbag assembly 300 may beneficially be compacted, both in the longitudinal direction 101 and in the transverse direction 103, with the intermediate portion 386 of the first tether 380 inserted through the opening 270 as shown. Thus, the steps needed to secure the first end 382 and the second end 384 of the first tether 380 to their respective positions on the forward tether 308 may be carried out with greater accessibility to the first end 382 and the second end 384, to which sewing, fastening, or other mechanical operations may need to be applied to effect the attachment to the forward tether 308.

Figure 12:
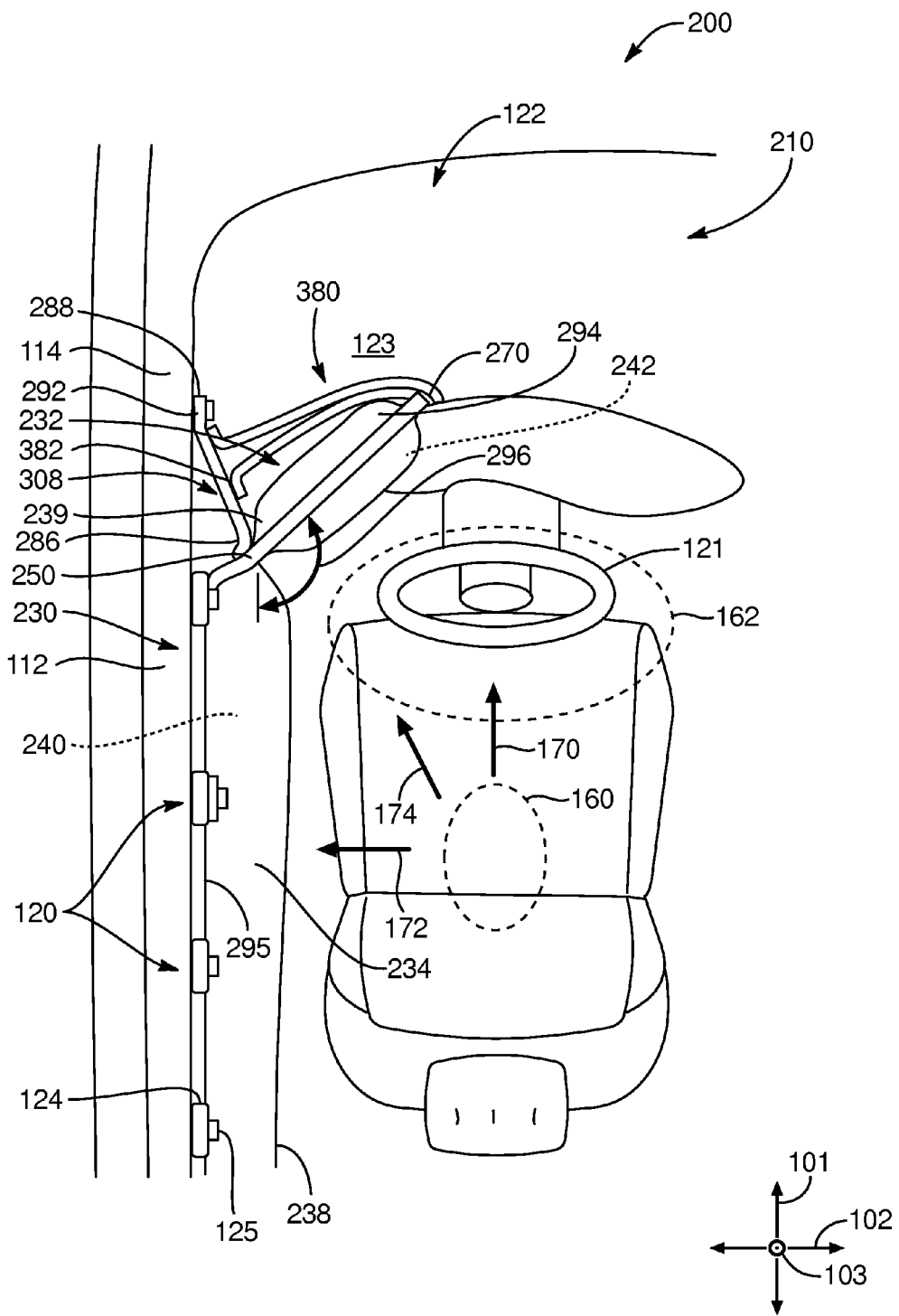
FIG. 12 is a top view of the airbag assembly of FIG. 10, wherein the inflatable curtain airbag is in the deployed configuration.

Referring to FIG. 12, a top view illustrates the airbag assembly 300 of FIG. 10, wherein the inflatable curtain airbag 210 is in the deployed configuration in response to a collision such as a small overlap or oblique collision. As shown, the second protection zone 232 has unfolded from the first protection zone 230 and is at a position nonparallel to the first protection zone 230. The second protection zone 232 may be positioned to block the gap between the first protection zone 230 and the position 162 of the driver's side airbag. The second protection zone 232 may thus be positioned generally between the occupant zone 160 of the occupant's head and the A-pillar 114 and the outboard portion 123 of the instrument panel 122, thereby providing protection from impact against these surfaces.

The inflatable curtain airbag 210 may remain partially folded at the chamber divider 250, which may define the natural fold line of the inflatable curtain airbag 210. As mentioned previously, the first stowed fold line 290 of the inflatable curtain airbag 210 may also be at the chamber divider 250, but in alternative embodiments, this need not be the case. A natural fold line at a different location from the chamber divider 250 may or may not affect the configuration of the deployed inflatable curtain airbag.

As shown in FIG. 12, the second protection zone 232 may unfold at an angle 296 relative to the first protection zone 230. The angle 296 may be determined by the level of tension provided by the forward tether 308, the engagement of the top edge 294 of the second protection zone 232 with interior surfaces of the vehicle, the geometry of the inflatable curtain airbag 210, and the length of the first tether 380. The angle 296 may advantageously be less than 180°. The angle 296 may fall within the range of 110° to 160°. More precisely, the angle 296 may fall within the range of 120° to 150°. Yet more precisely, the angle 296 may fall within the range of 130° to 140°. Still more precisely, the angle 296 may be about 135°.

There are multiple sequences of events that may lead to the positioning of the inflatable curtain airbag 210 illustrated in FIG. 12. The second protection zone 232 may inflate generally simultaneously with the inflation of the first protection zone 230, or may inflate after the first protection zone 230 has substantially fully inflated. Further, the second protection zone 232 may inflate at the first stowed fold line 290 first, and then at the second stowed fold line 298. Alternatively, inflation of the second protection zone 232 may be substantially simultaneous at the first stowed fold line 290 and at the second stowed fold line 298.

The first tether 380 may operate to control the degree to which the second protection zone 232 must unfold from the first protection zone 230. Thus, the first tether 380 may cause the angle 296 to be at least a minimum value so that the second protection zone 232 does not extend too far inboard to adversely interact with the occupant or the driver's side airbag. Furthermore, during deployment, the first tether 380 may act to draw the forward edge 292 forward, thus ensuring that forward motion occurs prior to inboard motion. This may ensure that the second protection zone 232 properly deploys behind the driver's side airbag, as represented by the position 162 in FIG. 12.

Consequently, the first tether 380 may act as a restraint member. The first tether 380 may restrict the position and orientation of the second protection zone 232 by exerting outboard force and/or forward force on the forward edge 292 of the second protection zone 232. A variety of alternative restraint members may be used to retain the second protection zone 232 at an angle such as the angle 296 relative to the first protection zone 230. According to alternative embodiments, other tethers (not shown) may be coupled proximate the forward edge 292 or elsewhere on the second protection zone 232, and may be secured to the first protection zone 230, the vehicle, the forward tether 308, any of the mounting assemblies 120, or any combination of the foregoing.

In addition to or in the alternative to the use of a restraint member to help control inboard motion and/or positioning of the second protection zone 232, it may be desirable to use a restraint member or other feature to perform the opposite function, i.e., to keep the angle 296 from becoming too large, thereby keeping the second protection zone 232 from inflating to a position at which the second protection zone 232 is parallel to the first protection zone 230, as shown in FIG. 9. This may help keep the second protection zone 232 properly positioned to provide small-overlap or oblique protection.

Figure 13:
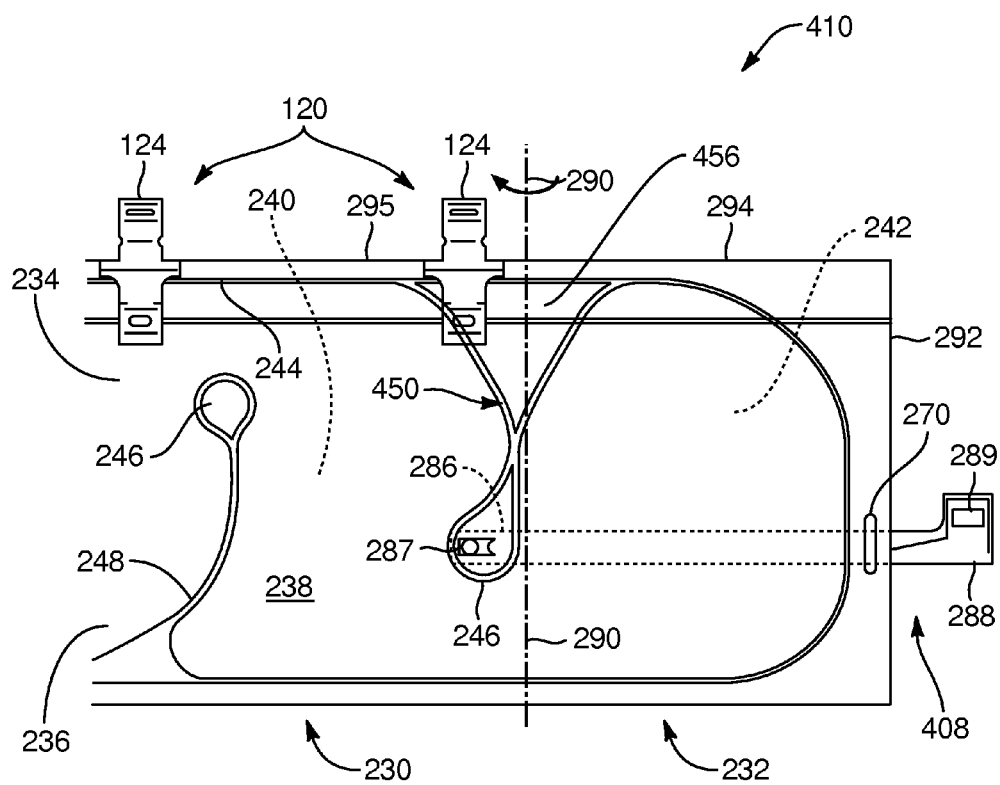
FIG. 13 is a side elevation view of the forward portion of an inflatable curtain airbag of an airbag assembly according to another alternative embodiment of the invention, prior to compaction of the inflatable curtain airbag into the stowed configuration.
Figure 13:
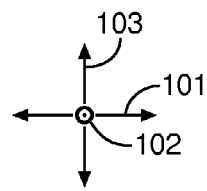

Referring to FIG. 13, a side elevation view illustrates the forward portion of an inflatable curtain airbag 410 of an airbag assembly 400 according to another alternative embodiment of the invention, prior to compaction of the inflatable curtain airbag 210 into the stowed configuration. The airbag assembly 400 may have a forward tether 408 that is somewhat similar to the forward tether 108 of FIGS. 1-3. The forward tether 108 need not pass through the opening 270 of the inflatable curtain airbag 410. Accordingly, the opening 270 may optionally be omitted from the inflatable curtain airbag 410 if desired. The forward tether 408 may simply provide longitudinal tension on the inflatable curtain airbag 410 in a manner similar to that of the forward tether 108.

The inflatable curtain airbag 410 may differ from the inflatable curtain airbag 210 in that the inflatable curtain airbag 410 may have a chamber divider 450 that includes a fold-over region 456 formed as part of the chamber divider 450. The fold-over region 456 may be similar to the non-inflating regions 246 in that, in the fold-over region 456, the inboard section 238 and the outboard section 239 may be secured together so as not to receive inflation gas. However, the fold-over region 456 may be shaped and positioned in such a manner that, when the forward and rearward portions of the inboard section 238 within the fold-over region 456 are secured together, the fold-over region 456 then limits the angle 296 to which the second protection zone 232 is able to unfold relative to the first protection zone 230. The forward and rearward portions of the inboard section 238 within the fold-over region 456 may be portions of the inboard section 238 on opposite sides of the first stowed fold line 290.

Figure 14:
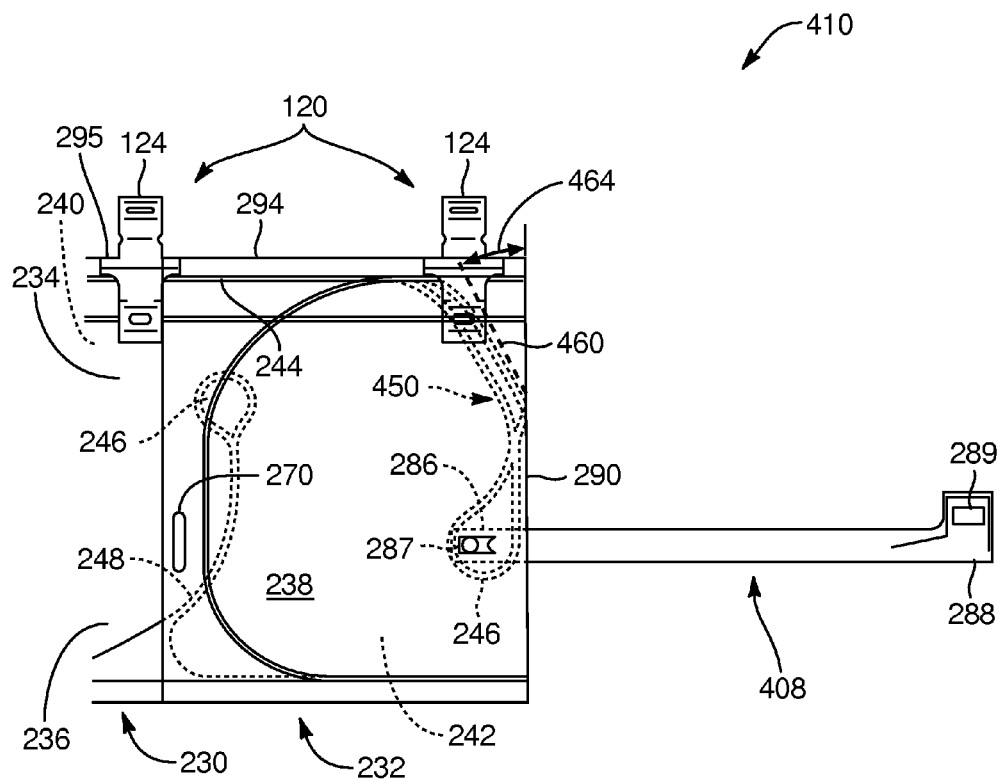
FIG. 14 is a side elevation view of the forward portion of the inflatable curtain airbag assembly of FIG. 13, after folding of the second protection zone rearward to overlie the forward portion of the first protection zone.
Figure 14:
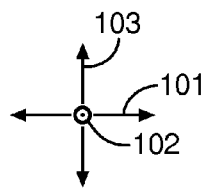

In FIG. 13, the fold-over region 456 may be located toward the top edge 295 of the first protection zone 230, but in other embodiments, may be positioned centrally or toward the bottom of the inflatable curtain airbag 410. In other alternative embodiments, more than one fold-over region may be used. FIG. 14 illustrates one way in which the forward and rearward portions of the inboard section 238 within the fold-over region 456 may be secured together through the use of an attachment feature. In this application, an "attachment feature" may be defined as any feature that serves to attach two objects together. An attachment feature may include attachment methods such as stitching, tape, staples, adhesives, a welding or brazing process such as RF or ultrasonic weld, or the like.

Referring to FIG. 14, a side elevation view illustrates the forward portion of the inflatable curtain airbag 410 of the airbag assembly 400 of FIG. 13 after the second protection zone 232 has been folded against the first protection zone 230 in the manner described in the description of FIG. 6, but prior to the performance of additional folding steps. As shown, the forward tether 408 may remain outside the opening 270 at this stage.

After the inflatable curtain airbag 410 has been folded in the manner shown, an attachment feature may be applied through the fold-over region 456. The attachment feature may serve to attach the forward and rearward portions of the inboard section 238 within the fold-over region 456 together.

In the embodiment of FIG. 14, the attachment feature is fold-over stitching 460. "Fold-over stitching" refers to stitching that passes through two flexible sections of an item that are folded together such that the same set of stitches will pass through both sections. Since the fold-over region 456 does not inflate, the fold-over stitching 460 may be applied through the inboard section 238 and the outboard section 239 without puncturing and/or interfering with the first chamber 240 or the second chamber 242. The fold-over stitching 460 may be applied along an angle 464 relative to the first stowed fold line 290. The angle 464 may be greater than 0° and less than 180°. The angle 464 may fall within the range of 30° to 90°. More precisely, the angle 464 may fall within the range of 40° to 80°. Yet more precisely, the angle 464 may fall within the range of 50° to 70°. Still more precisely, the angle 464 may be about 60°.

The angle 464 may position the fold-over stitching 460 such that the fold-over stitching 460 is generally tangent to, or parallel to a tangent to, the first chamber 240 and/or the second chamber 242. Consequently, the angle 464 may serve to orient the fold-over stitching 460 generally perpendicular to a direction along which tensile stresses will manifest in the inflatable curtain airbag 410. For example, upon inflation, the first chamber 240 and the second chamber 242 may each exert tensile stress on the surrounding fabric with an orientation generally outward from the first chamber 240 and the second chamber 242. Thus, the angle 464 may orient the fold-over stitching 460 generally perpendicular to this tensile stress. This may advantageously help avoid allowing the fold-over stitching 460, or more specifically, the holes formed in the fabric during the associated stitching process, to act as origin points for tear propagation.

The displacement of the fold-over stitching 460 from the chamber divider 250 may control the angle to which the second protection zone 232 is able to deploy relative to the first protection zone 230. A relatively small displacement may cause the fold-over stitching 460 to have relatively little effect on the unfolding of the second protection zone 232, so that the second protection zone 232 is able to unfold to a position nearly parallel to the first protection zone 230. Conversely, a relatively large displacement may cause the fold-over stitching 460 to have a more dramatic effect on the unfolding of the second protection zone 232, thereby causing the second protection zone 232 to deploy at a smaller angle relative to the first protection zone 230.

The fold-over stitching 460 may serve to secure the fold-over region 456 to itself in a manner that impedes full unfolding of the second protection zone 232 from the first protection zone 230. This may help position the second protection zone 232 to provide small overlap and/or oblique protection, as shown in FIG. 15.

Figure 15:
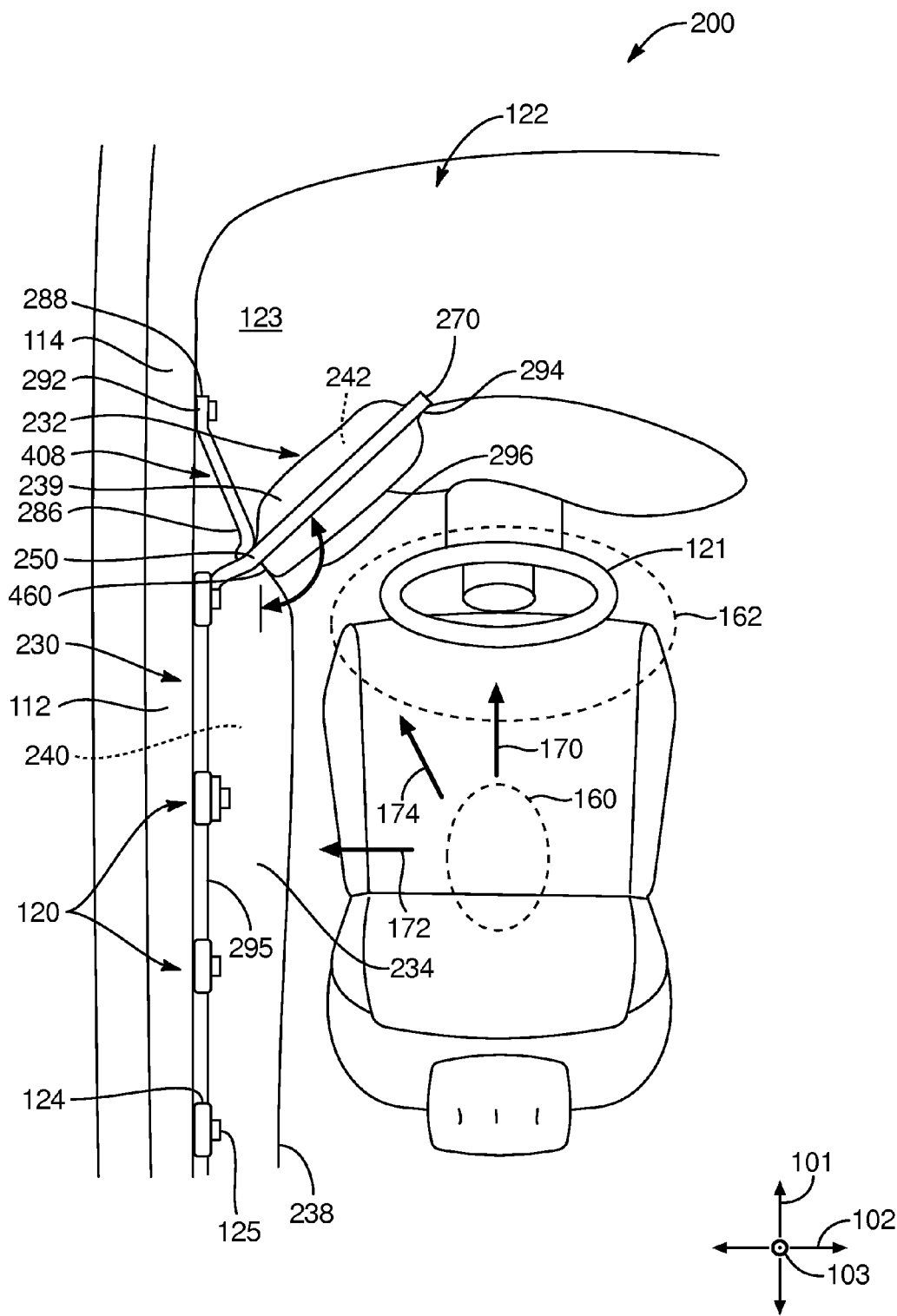
FIG. 15 is a top view of the airbag assembly of FIG. 13, wherein the inflatable curtain airbag is in the deployed configuration.

Referring to FIG. 15, a top view illustrates the airbag assembly 400 of FIG. 13, wherein the inflatable curtain airbag 410 is in the deployed configuration in response to a collision such as a small overlap or oblique collision. As in the previous embodiment, the second protection zone 232 has unfolded from the first protection zone 230 and is at a position nonparallel to the first protection zone 230. More specifically, the second protection zone 232 may be at an angle 496 relative to the first protection zone 230. The ranges set forth for the angle 296 above may also apply to the angle 496.

Accordingly, the second protection zone 232 may be positioned to block the gap between the first protection zone 230 and the position 162 of the driver's side airbag. The second protection zone 232 may thus be positioned generally between the occupant zone 160 of the occupant's head and the A-pillar 114 and the outboard portion 123 of the instrument panel 122, thereby providing protection from impact against these surfaces.

The fold-over stitching 460, as shown, may keep the adjacent surfaces of the inboard section 238 within the fold-over region 456 secured together such that the second protection zone 232 is generally unable to pivot further forward or outboard of the position shown in FIG. 15. Thus, the fold-over stitching 460 may act as a restraint member. However, the fold-over stitching 460 may serve a purpose different from that of the forward tether 408 and the first tether 380, which may generally be used to expedite, rather than restrict, outboard and/or forward deployment of the second protection zone 232.

In alternative embodiments (not shown), multiple restraint members may be used on a single inflatable curtain airbag to accomplish both purposes. According to one such alternative embodiment (not shown), fold-over stitching as in FIGS. 13-15 may be used in combination with a forward tether as in FIGS. 4-9 and/or a first tether as in FIGS. 10-12. Such embodiments may beneficially help avoid premature contact between the occupant and the second protection zone 232 while also ensuring that the second protection zone 232 is deploys into a position suitable for small overlap or oblique collision protection.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag assembly for disposition proximate a roof of a vehicle to shield a vehicle occupant from impacting at least one of a lateral surface, an A-pillar, and an instrument panel of the vehicle, the airbag assembly comprising:
    an inflatable curtain airbag having a stowed configuration for disposition proximate the roof of the vehicle and a deployed configuration into which the inflatable curtain airbag deploys downward between the vehicle occupant and the at least one lateral surface of the vehicle, the inflatable curtain airbag comprising:
        a first protection zone comprising a first interior chamber; and
        a second protection zone comprising a second interior chamber in fluid communication with the first interior chamber;
    a restraint member coupled to the second protection zone, the restraint member comprises one of a forward tether comprising a first end secured to the inflatable curtain airbag and a second end securable to the A-pillar, and a first tether secured to the forward tether; and
    a plurality of mounting assemblies distributed along a length of the inflatable curtain airbag to facilitate attachment of the inflatable curtain airbag to the vehicle;
    wherein in the stowed configuration, all of the plurality of mounting assemblies are positioned rearward of the A-pillar so that the second end of the forward tether is the only feature of the airbag assembly that is secured to the A-pillar;
    wherein, in the stowed configuration, the inflatable curtain airbag is folded at a first stowed fold line such that the second protection zone lies alongside a portion of the first protection zone;
    wherein, during deployment, the restraint member exerts outboard force on the second protection zone to move the second protection zone forward to be positioned forward of the first protection zone in the deployed configuration;
    wherein, in the deployed configuration, the second protection zone is positioned between an occupant zone that would ordinarily be occupied by the vehicle occupant's head and at least one of the A-pillar of the vehicle and a portion of the instrument panel of the vehicle.

2. The airbag assembly of claim 1, wherein, in the deployed configuration, the second protection zone extends to a height proximate the roof of the vehicle.

3. The airbag assembly of claim 1, wherein the inflatable curtain airbag comprises a deployed fold line comprising a divider that defines the first interior chamber as distinct from the second interior chamber;
    wherein, in the deployed configuration, the second protection zone is unfolded at the deployed fold line to define an angle less than 180° relative to the first protection zone.

4. The airbag assembly of claim 3, wherein the inflatable curtain airbag comprises an inboard section that faces inboard and is disposed in the first protection zone and the second protection zone in the deployed configuration;
    wherein the inflatable curtain airbag comprises an attachment feature by which the inboard section of the first protection zone is secured to the inboard section of the second protection zone, wherein the attachment feature is displaced from the deployed fold line by a displacement selected to keep the second protection zone from unfolding beyond the angle.

5. The airbag assembly of claim 1, wherein in the stowed configuration, the inflatable curtain airbag is further folded at a second stowed fold line generally parallel to the first stowed fold line such that the inflatable curtain airbag defines a Z-shape when viewed from along the first and second stowed fold lines.

6. The airbag assembly of claim 5, wherein the restraint member comprises a forward tether comprising a first end secured to the inflatable curtain airbag and a second end securable to the A-pillar.

7. The airbag assembly of claim 6, wherein the second protection zone comprises an opening proximate a forward edge of the second protection zone;
    wherein the forward tether extends through the opening such that, during deployment, the opening slides along the tether toward the second end of the forward tether to urge the forward edge to move generally along the forward tether.

8. The airbag assembly of claim 7, wherein the inflatable curtain airbag comprises an outboard section that faces outboard in the deployed configuration;
    wherein the first end of the forward tether is secured to an outboard section of the first protection zone such that, between the first end and the opening, the tether is positioned outboard of the inflatable curtain airbag.

9. The airbag assembly of claim 5, further comprising a forward tether comprising a first end secured to the inflatable curtain airbag and a second end securable to the A-pillar;
    wherein the second protection zone comprises an opening proximate a forward edge of the second protection zone;
    wherein the restraint member comprises a first tether comprising an intermediate portion that extends through the opening such that, during deployment, the opening slides along the intermediate portion to urge the forward edge to move generally along the first tether.

10. The airbag assembly of claim 9, wherein the first tether further comprises a first end secured to the forward tether, and a second end secured to the forward tether at a location selected such that, in the deployed configuration, the second end of the first tether is forward of the first end of the first tether.

11. The airbag assembly of claim 1, further comprising:
    an inflator that produces gas in response to detection of impact to trigger deployment of the inflatable curtain airbag; and
    a rearward tether comprising a first end secured to the inflatable curtain airbag and a second end securable to the vehicle rearward of the inflatable curtain airbag;
    wherein, in the deployed configuration, the rearward tether and the forward tether cooperate to keep the first protection zone under tension in a longitudinal direction.

12. A method for stowing an airbag assembly proximate a roof of a vehicle having a lateral surface, an A-pillar, and an instrument panel, to protect an occupant in the vehicle, the method comprising:
    providing an inflatable curtain airbag comprising a first protection zone comprising a first interior chamber and a second protection zone comprising a second interior chamber in fluid communication with the first interior chamber;
    providing a restraint member;
    folding the inflatable curtain airbag at a first stowed fold line such that the second protection zone overlies at least a portion of the first protection zone;
    compacting the inflatable curtain airbag into a generally elongated shape; and
    securing the inflatable curtain airbag proximate the roof of the vehicle such that, in response to introduction of inflation gas into the inflatable curtain airbag, the first protection zone expands downward to be positioned between the vehicle occupant and the lateral surface of the vehicle;

coupling the restraint member to the second protection zone such that, during deployment, the restraint member exerts outboard force on the second protection zone to move the second protection zone forward to be positioned forward of the first protection zone;

wherein the inflatable curtain airbag comprises a deployed fold line comprising a divider that defines the first interior chamber as distinct from the second interior chamber;

wherein unfolding the second protection zone comprises positioning the second protection zone between an occupant zone that would ordinarily be occupied by the vehicle occupant's head and at least one of the A-pillar of the vehicle and a portion of the instrument panel of the vehicle; and wherein unfolding the second protection zone comprises unfolding the second protection zone at the deployed fold line to define an angle less than 180° relative to the first protection zone after deployment.

13. The method of claim 12, wherein the inflatable curtain airbag comprises an inboard section disposed in the first protection zone and the second protection zone that faces inboard after deployment; the method further comprising:

securing the inboard section of the first protection zone to the inboard section of the second protection zone with an attachment feature displaced from the deployed fold line by a displacement selected to keep the second protection zone from unfolding beyond the angle during deployment.

14. The method of claim 12, further comprising folding the inflatable curtain airbag at a second stowed fold line generally parallel to the first stowed fold line such that the inflatable curtain airbag defines a Z-shape when viewed from along the first and second stowed fold lines.

15. The method of claim 14, wherein the restraint member comprises a forward tether comprising a first end and a second end, and the second protection zone comprises an opening proximate a forward edge of the second protection zone, the method further comprising:

securing the first end of the forward tether to the inflatable curtain airbag;

securing the second end of the forward tether to the A-pillar; and inserting the forward tether through the opening such that, during deployment, the opening slides along the tether toward the second end of the forward tether to urge the forward edge to move generally along the forward tether.

16. The method of claim 14, wherein the second protection zone comprises an opening proximate a forward edge of the second protection zone, the method further comprising:

providing a forward tether comprising a first end secured to the inflatable curtain airbag and a second end securable to the A-pillar;

wherein the restraint member comprises a first tether coupled to the forward tether, the restraint member comprising an intermediate portion that extends through the opening such that, during deployment, the opening slides along the intermediate portion to urge the forward edge to move generally along the first tether.

17. An airbag assembly, comprising:

an airbag within a vehicle, the airbag comprising a first protection zone and a second protection zone folded against the first protection zone such that the second protection zone overlies at least a portion of the first protection zone, the airbag comprising a deployed fold line comprising a divider that defines a first interior chamber of the first protection zone as distinct from a second interior chamber of the second protection zone;

wherein the first protection zone is secured to the second protection zone via an attachment feature displaced from the deployed fold line by displacement;

an inflator in fluid communication with a first chamber within the first protection zone and a second chamber within the second protection zone;

wherein, in response to production of gas by the inflator, the airbag deploys such that the first protection zone is positioned between an occupant of the vehicle and an interior surface of the vehicle;

wherein, in response to production of the gas, the second protection zone pivots away from first protection zone;

wherein, during deployment, the second protection zone unfolds at the deployed fold line;

wherein the displacement is selected such that the attachment feature limits unfolding of the second protection zone to an angle less than 180° relative to the first protection zone.

18. The airbag assembly of claim 17, wherein the attachment feature comprises fold-over stitching; wherein the airbag comprises an inflatable curtain airbag having a stowed configuration proximate a roof of the vehicle and a deployed configuration into which the inflatable curtain airbag deploys downward between the occupant and the at least one lateral surface of the vehicle, the airbag assembly further comprising:

a restraint member coupled to the second protection zone such that, during deployment, the restraint member urges the second protection zone to unfold forward of the first protection zone.

* * * * *